United States Patent [19]

Calundann et al.

[11] Patent Number: 5,290,884

[45] Date of Patent: Mar. 1, 1994

[54] BLENDS OF POLYBENZIMIDAZOLES AND AROMATIC POLYAMIDES, AROMATIC POLYAMIDE-HYDRAZIDES OR AROMATIC POLYAMIDES CONTAINING HETEROCYCLIC LINKAGES

[75] Inventors: Gordon W. Calundann, N. Plainfield, N.J.; Friedrich Herold, Frankfurt; Edward C. Chenevey, N. Plainfield; Tai-Shung Chung, Randolph, both of N.J.

[73] Assignee: Hoechst Celanese Corp., Somerville, N.J.

[21] Appl. No.: 675,782

[22] Filed: Mar. 27, 1991

[51] Int. Cl.$^5$ .................. C08L 79/06; C08L 77/06; C08G 73/08

[52] U.S. Cl. ................... 525/432; 525/435; 525/436

[58] Field of Search .................. 525/432, 435, 426

[56] References Cited

U.S. PATENT DOCUMENTS

| | | | |
|---|---|---|---|
| 3,632,548 | 1/1972 | Preston | 528/331 |
| 3,708,439 | 1/1973 | Sayigh | 528/363 |
| 3,944,522 | 3/1976 | Tohyama | 528/363 |
| 3,957,735 | 5/1976 | Ridgway | 528/363 |
| 3,993,625 | 11/1976 | Kurihara | 528/363 |
| 4,001,268 | 1/1977 | Kovar | 528/363 |
| 4,020,142 | 4/1977 | Davis | 528/363 |
| 4,048,139 | 9/1977 | Calundann | 524/88 |
| 4,321,182 | 3/1982 | Davitt | 524/233 |
| 4,842,740 | 7/1989 | Chung et al. | 521/134 |
| 4,847,354 | 7/1989 | Keil | 528/340 |
| 4,973,629 | 11/1990 | Williams et al. | 525/432 |
| 5,137,985 | 8/1992 | Chen, Sr. et al. | 525/432 |

OTHER PUBLICATIONS

Chemical Abstracts (HOST STN), vol. 113, No. 8, 20th Aug. 1990, Abstract No. 60375n, M. M. Iovleva et al, "Upper & Lower Critical Temperature of Mixing of Solutions of Rigid-Chain Aromatic Polyamides".

CA 69: 52486g.
CA 83: 60353r.
CA 85: 178022b.
CA 84: 5428q.
CA 85: 109137f.

Primary Examiner—John Kight, III
Assistant Examiner—P. Hampton-Hightower
Attorney, Agent, or Firm—Joseph M. Mazzarese

[57] ABSTRACT

A novel miscible blend of component polymers comprised of from about 5 weight percent to about 95 weight percent of a polybenzimidazole and from about 95 weight percent to about 5 weight percent of an aromatic polyamide, aromatic polyamide-hydrazide or aromatic polyamide containing heterocyclic linkages. Miscibility of the component polymers of the blend is indicated by infrared, X-Ray and Differential Scanning Calorimetry analyses and scanning electron photomicrographs. In a film or molded article of a blend mostly comprised of a polybenzimidazole, it is preferred that the aromatic polyamide, aromatic polyamide-hydrazide or aromatic polyamide containing heterocyclic linkages be present in the blend in an amount sufficient to result in a blend with improved tensile properties compared to the polybenzimidazole and that is more thermally processable than the polybenzimidazole. In a blend mostly comprised of an aromatic polyamide, aromatic polyamide-hydrazide or aromatic polyamide containing heterocyclic linkages, it is preferred that the polybenzimidazole be present in the blend in an amount sufficient to result in a blend with increased thermal stability and nonflammability compared to the aromatic polyamide, aromatic polyamide-hydrazide or aromatic polyamide containing heterocyclic linkages. The blends, particularly in the form of films or molded articles, may be post-treated with heat or sulfonating agent in order to minimize their shrinkage when subsequently subjected to heat and in order to increase their resistance to solvents and acids.

15 Claims, 11 Drawing Sheets

BLENDS OF POLYBENZIMIDAZOLES AND AROMATIC POLYAMIDES, AROMATIC POLYAMIDE-HYDRAZIDES OR AROMATIC POLYAMIDES CONTAINING HETEROCYCLIC LINKAGES

This invention is concerned with novel blends comprised of a polybenzimidazole and an aromatic polyamide, aromatic polyamide-hydrazide or aromatic polyamide containing heterocyclic linkages. The novel blends are suitable for the formation of coatings, films, fibers, fibrets, molding compositions, and the like.

Fibers and fibrets and their preparation from the blends of this invention are the subject of a concurrently filed application.

BACKGROUND OF THE INVENTION

The number of known classed of high performance polymers which are useful under severe environmental conditions is limited. In addition, some of the known classes of polymers are deficient in some properties, e.g., physical properties, solvent and thermal resistance, and processability. Some are also quite expensive.

Developments in the synthesis of rigid rod-like polymers have generated interest in forming composites by blending those polymers with conventional flexible coil polymers. This interest is based on potential improvements in fracture and impact toughness as well as other properties. In other words, the rigid rod-like polymer might behave as a strength member in a ductile matrix while the flexible matrix might provide toughness. However, achieving the potential benefits has been elusive in practice.

PRIOR ART

Polybenzimidazoles are generally characterized by a high degree of thermal and chemical stability. They may be shaped to form fibers, fibrets, films, and other articles of wide utility which show resistance to degradation by heat, hydrolytic media and oxidizing media. However, many of the polybenzimidazoles are not easily thermally processable at desirably low enough temperatures and pressures. In addition, the polybenzimidazoles have relatively high moisture regain, which, although desirable for some textile fibers, is undesirable for engineering plastics and composites. The polybenzimidazoles are also rather expensive polymers.

Aromatic polyamides are the condensation products of aromatic dicarboxylic acids and aromatic diamines. Aromatic polyamide-hydrazides are the condensation products of aromatic dicarboxylic acids, hydrazine, aromatic aminocarboxylic acids and aromatic diamines. Aromatic polyamides containing heterocyclic linkages are the condensation products of aromatic dicarboxylic acid chlorides and aromatic diamines, one of which contains heterocyclic linkages. The three kinds of polyamides are characterized as generally having high glass transition temperatures and high heat distortion temperatures. Certain structures of the polyamides are capable of developing high tensile properties in the drawn state, but they do not have good nonflammability characteristics.

Takayanagi et al. (M. Takayanagi et al., *J. Macromol. Sci. Phys.*, B17, 591(1980)) apparently conducted the first reported experiment on blending rigid microfibrils of wholly aromatic polyamides such as poly(1,4-benzamide) (PBA), poly(1,4-phenylene terephthalamide) (PPTA), and their block copolymers with nylon 6 or nylon 66. When one of those composites was fractured, they found in the fractured surface that microfibrils of PPTA were dispersed in the polymer matrix. Addition of a small percentage of polyaramides resulted in a blend fiber with better modulus and thermal properties. The composite produced by Takayanagi is comprised of discrete fibrils of high modulus PPTA dispersed in a nylon matrix. The composite is not a miscible system.

Hwang and coworkers (W. F. Hwang et al., *Polym. Eng. Sci.*, 23, 784 (1983) and W. F. Hwang et al., *J. Macromol. Sci. Phys.*, B22, 231(1983)) studied the phase diagrams and blend fiber properties of poly(p-phenylenebenzobisthiazole) (PBZT) with either poly(2,5,(6')-benzimidazole) or poly(2,5,(6')-benzothiazole). PBZT is a rigid rod-like polymer, and the other two are flexible polymers. Results showed that a molecular level composite of highly dispersed, oriented PBZT molecules in these flexible matrices was achieved. Films and fibers prepared from solution processing were reported to have very high modulus and strength, which improved further upon heat treatment. The characteristics of this system are similar to those of Takayanagi et al. Hwang et al. also must use a mixture of two strong acids to dissolve the polymers. Their resulting blend of polymers is not nearly as miscible as the blends of the invention. The blends of the invention are miscible as indicated by infrared, X-ray diffraction and Differential Scanning Calorimetry analyses and electron photomicrographs.

SUMMARY OF THE INVENTION

Briefly, the invention comprises a novel miscible blend of component polymers comprised of from 5 weight percent to about 95 weight percent of a polybenzimidazole and from about 95 weight percent to about 5 weight percent of an aromatic polyamide, aromatic polyamide-hydrazide or aromatic polyamide containing heterocyclic linkages. Preferably, the blend is comprised of at least about 10 to about 30 weight percent of a polybenzimidazole or an aromatic polyamide, an aromatic polyamide-hydrazide or an aromatic polyamide containing heterocyclic linkages.

The blends of the invention may be prepared by a process which comprises dissolving component polymers comprised of a polybenzimidazole and an aromatic polyamide, aromatic polyamide-hydrazide or aromatic polyamide containing heterocyclic linkages in a mutual evaporative solvent in relative weight proportions of each polymer of from about 5 to about 95 weight percent of the polybenzimidazole to about 95 to about 5 weight percent of the aromatic polyamide, aromatic polyamide-hydrazide or aromatic polyamide containing heterocyclic linkages, and then using the solution to form products (e.g., films and fibers) or adding the solution to a nonsolvent to precipitate the novel blend and subsequently drying the blend for use as a molding composition, etc.

The blends, particularly in the form of films, fibers and fibrets, may be post-treated with heat and/or a sulfonating agent in order to minimize their shrinkage when subsequently subjected to heat and in order to increase their resistance to solvents and acids.

The novel blends of this invention have unexpected properties and benefits. The blends are useful under severe environmental conditions. The blends have good thermal resistance, flame resistance, solvent resistance, improved physical properties and good price/performance characteristics.

Although polybenzimidazoles generally have high thermal stability and good solvent resistance, they are expensive polymers with high moisture regain. Certain aromatic polyamides, aromatic polyamide-hydrazides and aromatic polyamides containing heterocyclic linkages have good physical properties, solvent solubility, and are less expensive than polybenzimidazoles, but their nonflammability is deficient in some respects.

Therefore, it is an object of this invention to provide blends containing polybenzimidazoles which are useful in molding, fiber or film forming processes and in applications where the polybenzimidazoles themselves were either not useful or not as useful.

It is a further object of this invention to provide blends containing polybenzimidazoles and aromatic polyamides, aromatic polyamide-hydrazides or aromatic polyamides containing heterocyclic linkages, which are less expensive than polybenzimidazoles, which have higher thermal stability and are less flammable than aromatic polyamides, aromatic polyamide-hydrazides or aromatic polyamides containing heterocyclic linkages, and which have better price/performance characteristics.

BRIEF DESCRIPTION OF THE FIGURES

FIG. 1c shows the Fourier Transform IR scan of FIG. 1b together with a scan of the heat-treated and drawn fibers of a 71.4/28.6 polybenzimidazole (PBI)/aromatic copolyamide (HMA) blend, as shown in FIG. 1a.

DESCRIPTION OF THE PREFERRED EMBODIMENTS

Figure 1A:
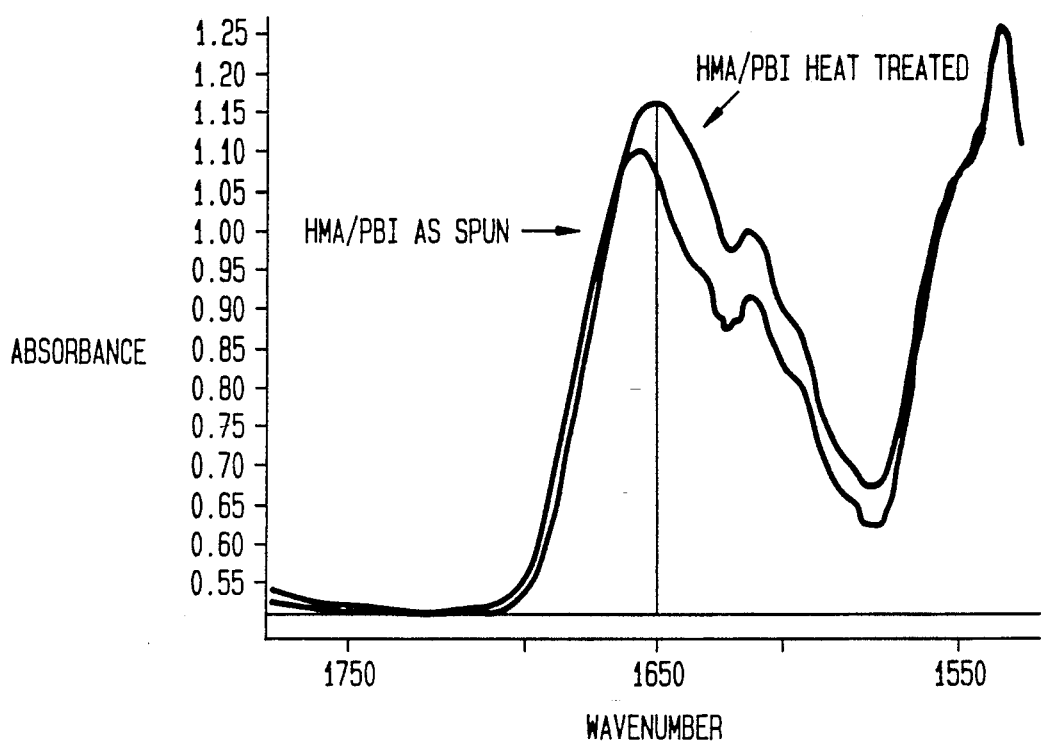
FIG. 1a shows the Fourier Transform IR scan of fibers of a 71.4/28.6 polybenzimidazole (PBI)/aromatic copolyamide (HMA) blend, indicating intermolecular hydrogen bonding. Because of the hydrogen bonding, the absorbance peak of the carbonyl group of the aromatic copolyamide shifted from 1657 to 1655 cm$^{-1}$ in the spun fiber and then to 1647 cm$^{-1}$ in the heat-treated and drawn fiber.

Polybenzimidazoles that may be used in the blends of the invention and processes for the preparation of the polybenzimidazoles are described in a number of U.S. Pat. Nos., e.g., 2,895,948; Re. 26,065; 3,901,855; 4,002,679; 3,433,772; 3,441,640; 3,509,108; 3,526,693; 3,549,603; 3,552,389; 3,619,453; 3,671,491; 3,969,430; and 4,020,142. In addition, a review of the processes for the preparation of polybenzimidazoles is contained in J. P. Critchley, G. J. Knight and W. W. Wright, *Heat-Resistant Polymers-Technologically Useful Materials*, Plenum Press, New York (1983), 259-322 and in the *Journal of Polymer Science*, Vol. 50, pages 511-539 (1961).

Although any polybenzimidazole described in the prior art may be used, the preferred polybenzimidazoles employed as starting materials to prepare the novel blends of the present invention are those having the repeating unit formula:

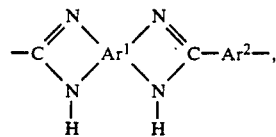

wherein

represents a tetravalent aromatic moiety having the formula:

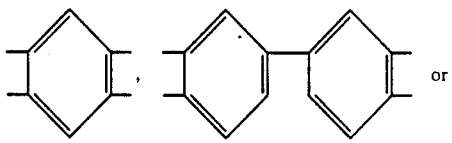

or

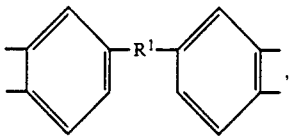

wherein $R^1$ is —O—, —SO$_2$—, —CH=CH—, or (—CH$_2$—)$_x$ and x is an integer of from 1 to 4; and —Ar$^2$— represents a divalent aromatic moiety having the formula:

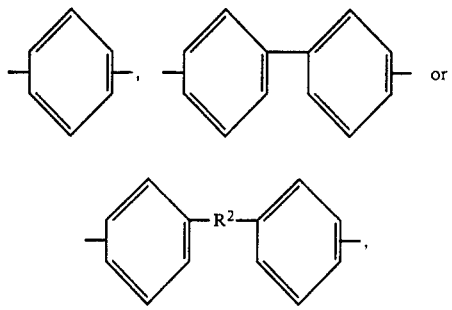

wherein $R^2$ is —O—, —SO$_2$—, —CH=CH—, or (—CH$_2$—)$_x$ and x is an integer of from 1 to 4.

Examples of the more preferred polybenzimidazoles which may be used to form the blends of the present invention include:

poly-2,2'-(m-phenylene)-5,5'-bibenzimidazole;
poly-2,2'-(pyridylene-3",5")-5,5'-bibenzimidazole;
poly-2,2'-(furylene-2",5")-5,5'-bibenzimidazole;
poly-2,2'-(naphthalene-1",6")-5,5'-bibenzimidazole;
poly-2,2'-(biphenylene 4",4"')-5,5'-bibenzimidazole;
poly-2,6'-(m-phenylene)-diimidazobenzene;
poly-2,2'-(m-phenylene)-5,5'-di(benzimidazole)ether;
poly-2,2'-(m-phenylene)-5,5'-di(benzimidazole)sulfide;
poly-2,2'-(m-phenylene)-5,5'-di(benzimidazole)sulfone;
poly-2,2'-(m-phenylene)-5,5'-di(benzimidazole)-methane;
poly-2,2'-(m-phenylene)-5,5" di(benzimidazole)-propane-2,2; and
poly-2,2"-(m-phenylene)-5,5" di(benzimidazole)-ethylene-1,2 where the double bonds of the ethylene groups are intact in the final polymer.

Poly-2,2'-(m-phenylene)-5,5'-bibenzimidazole, which contains recurring units of the formula:

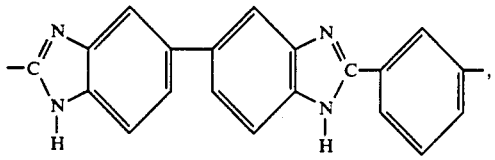

is most preferred. Polybenzimidazoles of this type are commercially available from HOECHST CELANESE Corporation. These polybenzimidazoles are preferred components of the blends because they are relatively more thermally stable and more soluble in N,N-dimethylacetamide than other polybenzimidazoles. This solubility makes them relatively processable.

A representative publication which discusses wholly aromatic polyamides is J. Preston, *Ultra-High Modulus Polymers*, A. Cifieri and I. M. Ward, Eds., Applied Science Publishers, London, 1979.

Generally, the aromatic polyamides used in the blends of the invention have the following unit formula:

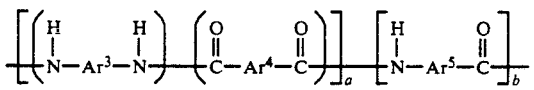

wherein Ar$^3$ and Ar$^4$ and Ar$^5$ represent divalent aromatic moieties having from 6 to about 18 carbon atoms, or mixtures thereof; and wherein a has a value of 0.5 to 1, b is 0 or a value less than 0.5, and the sum of a and b is equal to 1. Mixtures of different kinds of each unit may be present in the aromatic polyamides used in the invention. For example, mixtures of diamines may be used in preparing the aromatic polyamides so that Ar$^3$, and similarly Ar$^4$, and/or Ar$^5$, may represent different divalent aromatic moieties.

Although other classes of aromatic polyamides may be used in the blends of this invention, the preferred aromatic copolyamides are those described in European Patent Application Serial No. 199,090 (corresponding U.S. patent application Ser. No. 841,842), which are incorporated herein by reference.

Therefore, if in the aromatic copolyamides the unit from the aromatic dicarboxylic acid

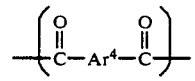

is denoted as an "A" unit, the unit

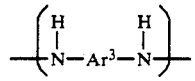

may be comprised of units

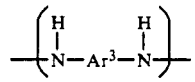  B

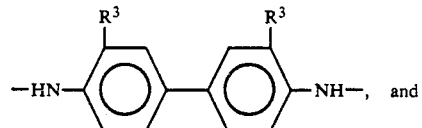  C

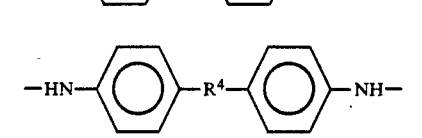  D where in Ar$^3$ the valence bonds are in para- or comparable coaxial or parallel position; $R^3$ is a halogen radical, or an alkyl or alkoxy radical each having up to 4 carbon atoms; $R^4$ is a substituted or unsubstituted methylene radical or a grouping —O—Ar$^3$—O—, wherein —Ar$^3$— is as specified above.

The more preferred aromatic copolyamides which may be used in the blends of the invention are those in which the mole % proportions of the diamine components B, C and D relative to the total amount of diamine components are within a domain which is defined by the following corner points:

point Q corresponds to 5 mole % of B, 45 mole % of C and 50 mole % of D;
point R corresponds to 45 mole % of B, 5 mole % of C and 50 mole % of D;
point S corresponds to 60 mole % of B, 35 mole % of C and 5 mole % of D;
point T corresponds to 20 mole % of B, 75 mole % of C and 5 mole % of D;
point U corresponds to 5 mole % of B, 80 mole % of C and 15 mole % of D;

and the aromatic copolyamide has an inherent viscosity of about 2.4 to 6.5 dl/g (measured on solutions of 0.5 g of copolyamide in 100 ml of 98% by weight concentrated $H_2SO_4$ at 25° C.).

A particular domain of interest within that domain is defined by the following corner points:
point Q' corresponds to 15 mole % of B, 45 mole % of C and 40 mole % of D;
point R' corresponds to 40 mole % of B, 20 mole % of C and 40 mole % of D;
point S' corresponds to 50 mole % of B, 40 mole % of C and 10 mole % of D;
point T' corresponds to 15 mole % of B, 75 mole % of C and 10 mole % of D.

Figure 7A:
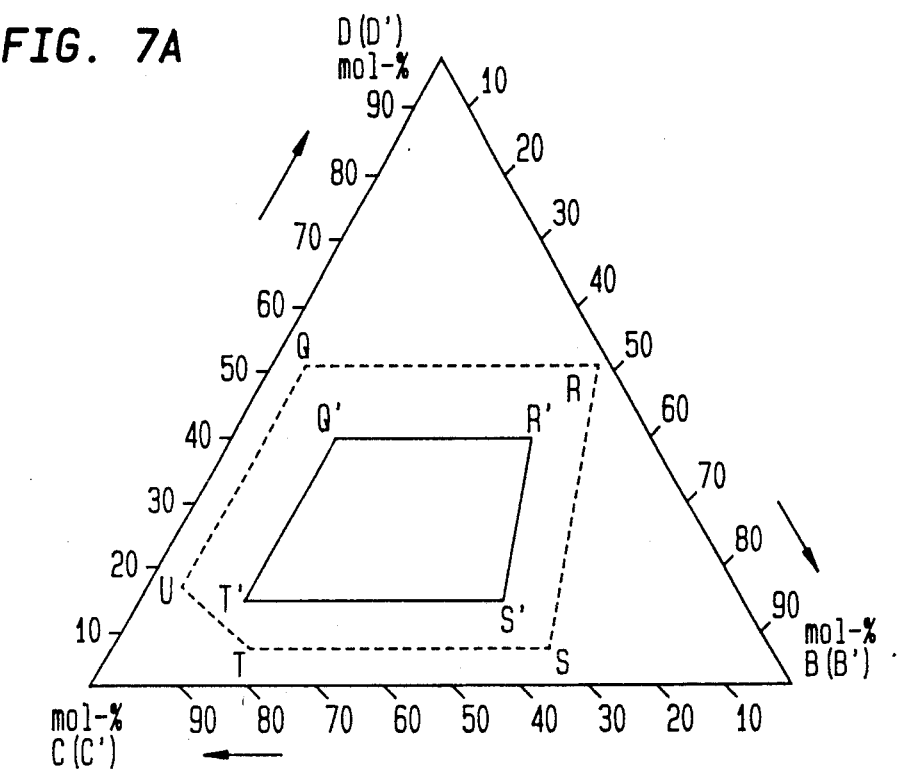
FIGS. 7a and 7b illustrate mole % proportions of diamine components of an aromatic polyamide within the scope of the present invention.
Figure 7B:
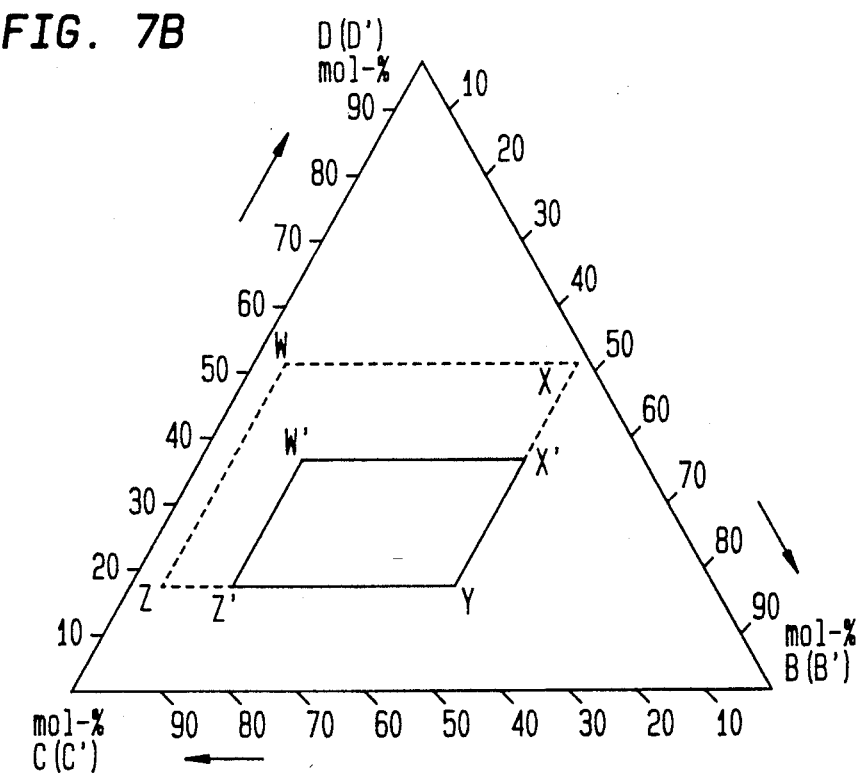

The ranges of these domains are graphed in FIG. 7a. Preferred ranges follow and are graphed in FIG. 7b.
point W corresponds to 5 mole % of B, 45 mole % of C and 50 mole % of D;
point X corresponds to 45 mole % of B, 5 mole % of C and 50 mole % of D;
point Y corresponds to 45 mole % of B, 40 mole % of C and 15 mole % of D;
point Z corresponds to 5 mole % of B, 80 mole % of C and 15 mole % of D;

and the aromatic copolyamide has an inherent viscosity of about 2.4 to 5.0 dl/g (measured on solutions of 0.5 g of copolyamide in 100 ml of 98% by weight concentrated $H_2SO_4$ at 25° C.).

A particular domain of interest within that domain is defined by the following corner points:
point W' corresponds to 15 mole % of B, 50 mole % of C and 35 mole % of D;
point X' corresponds to 45 mole % of B, 20 mole % of C and 35 mole % of D;
point Y corresponds to 45 mole % of B, 40 mole % of C and 15 mole % of D;
point Z' corresponds to 15 mole % of B, 70 mole % of C and 15 mole % of D;

Preferably, $Ar^3$ and $Ar^4$ each denote a 1,4-phenylene radical; $R^3$ is $—CH_3$, $—OCH_3$ or $—Cl$; and $R^4$ is a —O—⟨○⟩—O—  or

—O—⟨○⟩—⟨○⟩—O—

Most preferred aromatic copolyamides which may be used in the blends and processes of this invention have repeating units derived from terephthalic acid and the following diamines:

(i) $H_2N$—⟨○(CH_3)⟩—⟨○(CH_3)⟩—$NH_2$, (ii) $H_2N$—⟨○⟩—O—⟨○⟩—O—⟨○⟩—$NH_2$ and (iii) $H_2N$—⟨○⟩—$NH_2$.

Preferred are mole ratios of (i):(ii):(iii) of 50:25:25 or 37.5:37.5:25.

Another class of aromatic polyamides is available commercially from Teijin Ltd. of Japan under the tradename Technola HM-50 in the form of a fiber. Information about the Technola HM-50 aromatic polyamides is contained in an article by J. Blackwell et al., *Macromolecules*, 20, 667-671 (1987). Technola HM-50 is an aromatic copolyamide of terephthaloyl chloride, p-phenylene diamine and 3.4'-diaminodiphenyl ether in a mole ratio of 50:25:25.

Aromatic polyamide-hydrazides may also be used to produce the blends of the invention. Those polymers and processes for their preparation are described in U.S. Pat. No. 3,632,548.

Generally, the aromatic polyamide-hydrazides used in the blends of the invention have the following unit formula:

$$-{\left[\begin{matrix}H & H \\ | & | \\ N-Ar^6-N\end{matrix}\right]}_d{\left[\begin{matrix}H & O & H & H \\ | & \| & | & | \\ N-Ar^7-C-N-N\end{matrix}\right]}_e{\left[\begin{matrix}O & O \\ \| & \| \\ C-Ar^8-C\end{matrix}\right]}_f{\left[\begin{matrix}H & H & O & O & H & H \\ | & | & \| & \| & | & | \\ N-N-C-Ar^9-C-N-N\end{matrix}\right]}_g-$$

wherein $Ar^6$, $Ar^7$, $Ar^8$ and $Ar^9$ represent divalent aromatic moieties having from 6 to about 18 carbon atoms, or mixtures thereof; and wherein d has a value of 0.5 to 1, e is 0 or a value less than 0.5, and g is 0 or a value less than 0.5, and the sum of d, e and g is equal to f.

Although other classes of aromatic polyamide-hydrazides may be used in the blends of this invention, a preferred aromatic polyamide-hydrazide is the polyterephthalamide of p-aminobenzhydrazide, which may be prepared from terephthaloyl chloride and p-aminobenzhydrazide.

Aromatic polyamides containing heterocyclic linkages may also be used to produce the blends of the invention. Those polymers and processes for their preparation are described in U.S. Pat. No. 3,484,407.

Generally, the aromatic polyamide containing heterocyclic linkages used in the blends of the invention contains units of the following formula:

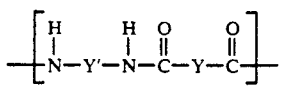

wherein Y' and Y separately represent $Ar^{10}$ and $Ar^{10}$—X—$Ar^{11}$—X—$Ar^{10}$ wherein $Ar^{10}$ and $Ar^{11}$ are multivalent aromatic moieties having from 6 to about 18 carbon atoms, or mixtures thereof; and X is a 5 or 6 member ring heterocyclic radical containing 2 to 3 hetero ring elements selected from the group consisting of N, O and S, and wherein at least one $Ar^{10}$—X—$Ar^{11}$—X—$Ar^{10}$ radical must be present in the recurring structural unit. Preferably, all occurrences of X in the polymer are the same, and the polymer has at least one plane of symmetry in each recurring unit. The moiety —X—$Ar^{11}$—X— may represent a fused ring system.

A preferred aromatic polyamide containing heterocyclic linkages is prepared from

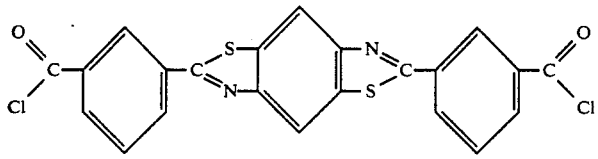

and 4,4'-diaminodiphenyl ether.

The aromatic acids which may be used to produce aromatic polyamides, aromatic polyamide-hydrazides or aromatic polyamides containing heterocyclic linkages typically are dicarboxylic acids in which each carboxyl group is attached to a carbon atom on the same ring or on an isolated or fused aromatic ring.

Representative examples of aromatic acids include terephthalic acid; isophthalic acid; diphenyl-4,4'-dicarboxylic acid; naphthalene-2,6-dicarboxylic acid; naphthalene-2,7-dicarboxylic acid; naphthalene-1,4-dicarboxylic acid; naphthalene-1,5-dicarboxylic acid; diphenylether,4,4'-dicarboxylic acid; diphenylsulfone-4,4'-dicarboxylic acid; diphenylmethane-4,4'-dicarboxylic acid and diphenoxyethane-4,4'-dicarboxylic acid; as well as the ester forming derivatives thereof.

Particularly desirable are those aromatic polyamides (and also aromatic polyamide-hydrazides and aromatic polyamides containing heterocyclic linkages) derived from aromatic diacids having the phthalate moiety,

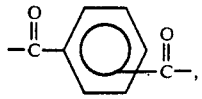

which may be from isophthalic acid, terephthalic acid or a mixture of the two at any ratios (e.g., ranging from 99% isophthalic acid and 1% terephthalic acid to 1% isophthalic acid and 99% terephthalic acid).

Representative aromatic diamines which may be used to produce the aromatic polyamides, aromatic polyamide-hydrazides or aromatic polyamides containing heterocyclic linkages typically are diamines in which the amino groups are attached to carbon atoms on the same ring or on isolated or fused aromatic rings. Examples of the aromatic diamines are 1,4-bis(p-aminophenoxy) benzene; 1,3-bis(p-aminophenoxy) benzene; 4,4'-diaminophenyl ether; 3,4'-diaminophenyl ether; 3,3'-diaminophenyl ether; 3,4'-diaminodiphenyl ether; 4,4'-diaminobiphenyl; 3,3'-diaminobiphenyl; 3,4'-diaminobiphenyl; and the like. The rings in the diamine compounds may have substituents such as aryl, alkyl, or alkoxy groups containing up to about 6 carbon atoms, or halogen radicals.

The aromatic aminoaroylhydrazide monomers which may be used to produce the aromatic polyamide-hydrazides typically have the amino and hydrazide groups attached to carbon atoms on the same ring or on isolated or fused benzene rings. Some examples are disclosed in U.S. Pat. No. 3,632,548.

Aromatic polyamides, aromatic polyamide-hydrazides and aromatic polyamides containing heterocyclic linkages may have incorporated therein units from aromatic amino acids such as p-aminobenzoic acid, m-aminobenzoic acid and the various aminonaphthalenecarboxylic acids.

One or more than one aromatic polyamide, aromatic polyamide-hydrazide and/or aromatic polyamide containing heterocyclic linkages may be blended with one or more polybenzimidazoles in the blends of the invention.

Blends of the component polymers of the invention are miscible, or compatible. Several criteria indicate blend compatibility or miscibility. They are:

a) Clearness of a film of the blend (by visual analysis aided by microscopic examination, if necessary);

b) Differential Scanning Calorimetry showing a single Tg, which indicates that the blend follows the rule of mixtures;

c) Fourier Transform Infrared analysis indicating intermolecular hydrogen-bonding; and d) X-ray diffraction analysis confirming that the component polymers interact and are compatible on a molecular scale.

Figure 3A:
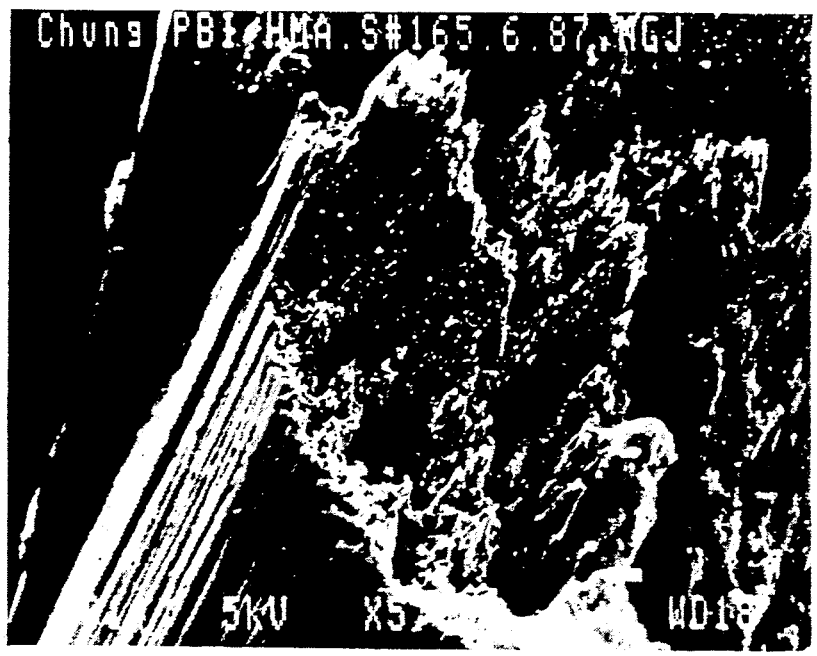
FIG. 3a is a 5,000 magnification scanning electron photomicrograph of a fracture surface of a fiber spun from a 50:50 blend of an aromatic copolyamide (HMA) and a polybenzimidazole (PBI).
Figure 3B:
FIG. 3b is a 5,560 magnification scanning electron photomicrograph of a fracture surface of a fiber spun from a polybenzimidazole (PBI).
Figure 3C:
FIG. 3c is a 2,000 magnification scanning electron photomicrograph of a fracture surface of a fiber spun from an aromatic copolyamide (HMA).
Figure 3D:
FIG. 3d is a 5,000 magnification scanning electron photomicrograph of a fracture surface of a fiber spun from an aromatic copolyamide (HMA).

It is surprising that the blends of the invention seem to be close to true solutions, but nevertheless are apparently true molecular composites with reinforcing elements on the order of molecular dimensions as evidenced by the physical properties of the blends and as evidenced by the scanning electron photomicrographs in FIG. 3a, FIG. 3b, FIG. 3c and FIG. 3d. FIG. 3a is a 5,000 magnification scanning electron photomicrograph of a fracture surface of a fiber spun from a 50:50 blend of an aromatic copolyamide and a polybenzimidazole. The photomicrograph shows that the degree of the blend is on the molecular level and that the fracture morphology is similar to that of a typical fracture of a rigid rod-like polymer. FIG. 3b is a 5560 magnification scanning electron photomicrograph of a fracture surface of a fiber spun from a polybenzimidazole and shows no orientation phenomenon. The fracture surface is quite flat, which is typical for a flexible chain polymer. FIG. 3c is a 2,000 magnification scanning electron photomicrograph of a fracture surface of a fiber spun from an aromatic copolyamide. FIG. 3d is a 5,000 magnification scanning electron photomicrograph of a fracture surface of a fiber spun from an aromatic copolyamide. FIGS. 3c and 3d show the highly oriented morphology of an aromatic copolyamide. Because aromatic polyamides have a LCP-like structure, it is very difficult to prepare good fracture surfaces for scanning electron photomicrographs. However, FIGS. 3a to 3d clearly indicate that the polybenzimidazole-aromatic copolyamide blend fiber has highly oriented fracture surfaces, which are similar to those of aromatic copolyamide fibers.

If a blend of the invention is comprised of a major amount of a polybenzimidazole, it is preferred that the minor amount of aromatic polyamide, aromatic polyamide-hydrazide or aromatic polyamide containing heterocyclic linkages in the blend be sufficient to improve physical properties of the polybenzimidazole, e.g., tensile strength and modulus, and to make the polybenzimidazole more tractable and more processable and also less susceptible to moisture, while retaining the desirable properties of the polybenzimidazole. When a polybenzimidazole is blended with an aromatic polyamide, aromatic polyamide-hydrazide or aromatic polyamide containing heterocyclic linkages, the hydrophilicity of the blend is less than that of the polybenzimidazole. At the same time, the less expensive aromatic polyamide, aromatic polyamide-hydrazide or aromatic polyamide containing heterocyclic linkages decreases the cost of the blend below the cost of the polybenzimidazole.

Generally, the preferred blends are comprised of from about 50 weight percent to about 95 weight percent of a polybenzimidazole and from about 50 weight percent to about 5 weight percent of an aromatic polyamide, aromatic polyamide-hydrazide or aromatic polyamide containing heterocyclic linkages. Preferably, the blends comprise at least about 10 weight percent of an aromatic polyamide, aromatic polyamide-hydrazide or aromatic polyamide containing heterocyclic linkages.

If a blend of the invention is comprised of a major amount of an aromatic polyamide, aromatic polyamide-hydrazide or aromatic polyamide containing heterocyclic linkages, it is preferred that the minor amount of polybenzimidazole in the blend be sufficient to result in a blend having improved thermal stability and nonflammability compared to the aromatic polyamide, aromatic polyamide-hydrazide or aromatic polyamide containing heterocyclic linkages. Preferably, the polybenzimidazole is present in an amount sufficient to result in a blend with greatly improved properties. More preferably, the blends are comprised of from about 60 weight percent to about 95 weight percent of an aromatic polyamide, aromatic polyamide-hydrazide or aromatic polyamide containing heterocyclic linkages and from about 40 weight percent to about 5 weight percent of a polybenzimidazole. Most preferably, based on preliminary tests, the blend should contain at least about 20 to about 30 weight percent of a polybenzimidazole in order to impart greatly enhanced heat resistance to the blend compared to the aromatic polyamide, aromatic polyamide-hydrazide or aromatic polyamide containing heterocyclic linkages.

Aromatic polyamides, aromatic polyamide-hydrazides or aromatic polyamides containing heterocyclic linkages are useful because of their generally good combination of properties. The aromatic polyamides, aromatic polyamide-hydrazides and aromatic polyamides containing heterocyclic linkages have high heat resistance, high strength-to-weight ratios, high modulus, high dielectric constant and dissipation factor over a wide range of temperatures and frequencies. They have generally good resistance to chemicals. Those properties can be substantially improved in accordance with this invention by incorporating a relatively more expensive polybenzimidazole in a miscible blend with the aromatic polyamide, aromatic polyamide-hydrazide or aromatic polyamide containing heterocyclic linkages. It appears that all the beneficial properties of the aromatic polyamides, aromatic polyamide-hydrazides or aromatic polyamide containing heterocyclic linkages may be retained and thermal properties and nonflammability may be improved at a moderate additional cost.

The more preferred blends are usually those which are comprised of about 20 to about 50% of either the polybenzimidazole or the aromatic polyamide, aromatic polyamide-hydrazide or aromatic polyamide containing heterocyclic linkages.

It is preferred that the aromatic polyamide, aromatic polyamide-hydrazide and aromatic polyamide containing heterocyclic linkages be soluble in an evaporative organic solvent.

The polybenzimidazoles and the aromatic polyamides, aromatic polyamide-hydrazides or aromatic polyamides containing heterocyclic linkages are soluble in a few selected evaporative solvents. Those polymers may be dissolved in N-methylpyrrolidinone (NMP), N,N-dimethylformamide (DMF), N,N-dimethylacetamide (DMAc), or dimethylsulfoxide (DMSO). Heating may be required to dissolve certain polymers in order to obtain a clear viscous solution.

In order to prepare miscible blends of the invention, the polybenzimidazoles and aromatic polyamides, aromatic polyamide-hydrazides or aromatic polyamides containing heterocyclic linkages may be first dissolved in a mutual evaporative solvent, e.g., DMF, DMAc, DMSO, or NMP, so that each polymer is present in the resulting solution at the desired concentration up to a total polymer concentration of, e.g., from about 1% to about 30%, preferably from about 1 to about 15%, and most preferably from about 4 to about 10%. The preferred solvents are DMAc and NMP. Acids may be used instead of the evaporative organic solvent, but they are not preferred. It is preferred that the total concentration of the component polymers in the solution be such that the viscosity of the solution is acceptable for subsequent processing. The component polymers may be simultaneously dissolved in the solvent; or each polymer may be separately dissolved in separate volumes of solvent, and desired portions of the resulting solutions can be mixed together to form a solution of the two polymers. For example, a solution or "dope," containing from about 20 to about 30 weight percent of a polybenzimidazole may be prepared and mixed with the solution of from about 6 to about 10 weight percent of an aromatic polyamide, aromatic polyamide-hydrazide or polyamide containing heterocyclic linkages. The resulting solution may range from about 10 to about 20 weight percent of the blend.

We have found that it is preferable to mix dopes of the component polymers with approximately the same viscosity, to apply high shears, and to mix the dopes just before use. In addition, blends of dopes prepared from NMP-based dopes of the component polymers tend to have better stability than blends of the DMAc-based dopes. Blend viscosity in DMAc decreases with time probably due to gelation. This phenomenon is enhanced if the solid content is increased. As a result, it is preferable to mix dopes of the component polymers just before use, to use NMP instead of DMAc and to keep the concentration of component polymers low if DMAc is used.

Preferably, the starting polymers for the process of the invention are dried to a level of about 0.1% to minimize problems. Drying may be accomplished in any convenient and effective manner, e.g., by drying the starting polymer overnight in vacuum at elevated temperature, e.g., from about 100° C. to about 160° C.

The polybenzimidazole and the aromatic polyamide, aromatic polyamide-hydrazide or aromatic polyamide containing heterocyclic linkages are each provided in the mixing solution in a concentration of about 1 to 30 percent by weight based upon the weight of the total solution, and preferably in a concentration of 12 to 20 percent by weight based upon the weight of the total solution. It is generally desirable to add lithium chloride to the solution in order to aid the dissolving of the component polymers for the blend. The lithium chloride serves the function of preventing the polybenzimidazole polymer from phasing out of the solution upon standing for extended periods of time, as well as aiding the dissolution of the polyamide. The range of effective amounts may be determined empirically. The solution preferably contains lithium chloride in a concentration of about 0.1 to 5 percent by weight, and most preferably in a concentration of about 1 to 4 percent by weight. A preferred solution comprises about 12 to 20 percent by weight of the component polymers, about 1 to 4 percent lithium chloride, and about 79 to 87 percent by weight dimethylacetamide. A particularly preferred spinning solution comprises approximately 14 to 17 percent by weight of the component polymers of the blend, approximately 2 percent by weight lithium chloride, and approximately 84 percent by weight dimethylacetamide. The spinning solution preferably exhibits a viscosity of about 40 to 4000 poise measured at 30° C., and most preferably a viscosity of about 1500 to 3500 poise measured at 30° C. One suitable means for dissolving the polymers in the solvent is by mixing the materials at a temperature above the normal boiling point of the solvent, for example, about 25° to 70° C. above such boiling point, and at a pressure of 2 to 15 atmospheres for a period of about 1 to 5 hours. The resulting solutions then preferably are filtered to remove any undissolved polymer.

Then the solution may be added to a non-solvent for the blend, e.g., methanol, tetrahydrofuran or acetone, to coagulate a novel blend of this invention with the desired concentration of component polymers. Preferably, the non-solvent is methanol, ethylene glycol, water, tetrahydrofuran or acetone. A solution of ethylene glycol and dimethylacetamide (preferably, 70:30) is preferred in the coagulation bath. Subsequently, the precipitated blend may be washed with, e.g., methanol or water, to remove residual solvent if it is present and then, e.g., vacuum dried at moderate temperatures. If, instead, films or fibers of the solution of the blend are cast or extruded, the solvent should be evaporated from the films or fibers at low relative humidity, e.g., in a dry nitrogen atmosphere, and moderate temperatures, e.g., at about $\geq 100°$ C. After a substantial portion of the solvent is removed (e.g., about 85%), the remaining solvent may be removed by washing the film or fibers with hot water. Whether the solution of the component blend is cast, extruded or precipitated, moisture should be initially excluded from the shaped article until most of the solvent is removed.

The component polymers of the blends of the invention have various degrees of compatibility or miscibility depending upon choice of component polymers for the blend and process conditions, which can be changed to produce the properties desired in the final product.

Another process for preparing moldable blends comprises grinding together a polybenzimidazole and an aromatic polyamide, polyamide-hydrazide or aromatic polyamide containing heterocyclic linkages in amounts of about 5 to about 95 weight percent of the polybenzimidazole to about 95 to about 5 weight percent of the aromatic polyamide, polyamide-hydrazide or aromatic polyamide containing heterocyclic linkages, until the diameters of the solid particulates reach about 100 $\mu$m or less. A freeze mill may be used for grinding, and the grinding process continued until the diameters of the solid particulates reach about 100 $\mu$m or less. Those fine solid blends have a uniform visual appearance and may be molded at high temperature and pressure (e.g., at $\geq 2000$ psi, 30 minutes at 450° C.). The molded product has a dark color, is rigid and exhibits superior physical integrity.

The blends of the present invention are capable of being sintered at temperatures within the range of approximately 350° C. to 500° C. Preferably, the blends are capable of being sintered at temperatures within the range of approximately 400° C. to 450° C.

The blends of the present invention are useful as a molding resin, and especially for sintering. Articles molded from 50:50 blends of the present invention exhibit good mechanical properties, such as tensile strength, tensile modulus, flexural strength, flexural modulus, notched Izod impact strength, and heat deflection temperature.

The blends of the invention may consist essentially of the two kinds of component polymers, i.e., one or a combination of polybenzimidazoles and one or a combination of the aromatic polyamide, aromatic polyamide-hydrazide or aromatic polyamide containing heterocyclic linkages. In that case, the percents of the two component polymers generally given herein are based on the total weight of the component polymers, which is also the total weight of the blend. However, if additional components are present in a composition containing the blend, then the percents generally given for the component polymers are based on their total weight and the percents of the other components are based on the total weight of the composition including the component polymers.

Articles may be molded from a molding compound which includes, as one component, a blend of the present invention. Such a molding compound incorporates into the blend of the present invention approximately 1 to 50 percent, preferably approximately 10 to 30 percent, by weight, based on the total weight of the molding compound, of a solid filler and/or reinforcing agent. Representative fibers which may serve as reinforcing media include glass fibers, asbestos, graphitic carbon fibers, amorphous carbon fibers, synthetic polymeric fibers, aluminum fibers, aluminum silicate fibers, oxide of aluminum fibers, titanium fibers, magnesium fibers, rock wool fibers, steel fibers, etc. Representative filler materials include calcium silicate, silica, clays, talc, mica, polytetrafluoroethylene, graphite, alumina trihydrate, sodium aluminum carbonate, barium ferrite, etc.

In order to form an article by sintering from the present blend, or from a molding compound made from the present blend, the blend or molding compound is placed in a mold cavity, cold or hot pressed, and then brought to the sintering temperature of the blend, e.g., approximately 300° C. to 450° C. The blend is pressed in the mold cavity at a pressure of approximately 500 to 10000 psi. The cycle time (i.e., the time between moldings) for the present blend is commonly about 10 to 40 seconds.

The properties of shaped articles formed from the blend of the present invention vary with processing conditions, such as mold temperature, pressure, cycle time, etc. However, it is possible to experimentally determine those conditions which maximize the properties of articles formed from the present blend.

The properties of the shaped articles formed from the blends of the present invention, especially blend compositions having a high content of the aromatic polyamide, aromatic polyamide-hydrazide or aromatic polyamide containing heterocyclic linkages, can be improved by heat treatment. The articles may be thermally treated in an inert atmosphere (e.g., nitrogen, argon, helium) or alternatively a flowing oxygen-containing atmosphere (e.g., air). For instance, the article may be brought to a temperature approximately 10° C. to 30° C. below the deformation or decomposition point of the blend. The heat treatment times commonly range from a few minutes to a number of days, e.g., from 0.5 to 200 hours, or more. Preferably, the heat treatment is conducted for a time of 48 to 72 hours.

Heat treatment can be expected to provide an increase in the heat deflection temperature of shaped articles made from the blend. The heat deflection temperature is a measure of the upper temperature at which articles formed from the blend can be effectively used. The blend of the present invention can be characterized as a high performance blend because it is capable of being formed into shaped articles having heat deflection temperatures of at least approximately 200° C. Thus, the blend of the present invention is useful in applications involving relatively high temperatures.

The blends, particularly in the form of films, fibers, or fibrets, may be post-treated with heat or a sulfonating agent for a period of time sufficient to minimize their shrinkage when subsequently subjected to heat and in order to increase their resistance to solvents, such as DMAc and NMP, and acids, e.g., concentrated inorganic acids, such as hydrochloric acid. After post-treatment, the films and fibers are no longer completely soluble in the solvents used to initially form the solutions of the constituent polymers, e.g., DMAc or NMP. Post-treating by heating in air or in an inert atmosphere at a temperature of from about 200° to about 500° C. for a period of time of from about 1 to about 30 minutes may be employed. The time-temperature relationship to obtain the required results can be determined empirically. Preferably, heating at a temperature of from about 300° to about 450° C. may be used.

Alternatively, the products made from the blends of the invention may be post-treated by treating with a sulfonating agent followed by heat setting at a temperature of from about 200° to about 500° C. for a period of time sufficient to minimize shrinkage when subsequently subjected to heat and to increase the products' resistance to solvents and acids. A solution of from about 1 to about 15% sulfonating agent followed by heat setting at a temperature of from about 200° to about 500° C. may be used. The sulfonating agent may be sulfuric acid, sulfur trioxide, toluene sulfonic acid or naphthalene sulfonic acid. Preferably, post-treatment is accomplished by dipping the products in 5% sulfuric acid followed by heat setting at a temperature of from about 350° to about 450° C. for a period of time sufficient to minimize the products' shrinkage when subsequently subjected to heat and to increase its resistance to solvents and acid.

The following examples describe the manner and process of making the blends of the invention and set forth the best mode contemplated by the inventors for carrying out the invention, but are not to be construed as limiting.

In the following examples, the preferred polybenzimidazole polymer is used, namely, poly-2,2'-(m-phenylene)-5,5'-bibenzimidazole (sometimes hereafter referred to as "PBI").

EXAMPLE 1

Six percent of one variant of HOECHST high performance HMA aromatic polyamide[1] was dissolved in NMP with 1% LiCl. The dope prepared in that manner was very viscous, behaved like a non-Newtonian fluid and showed a rod-climbing phenomenon (Weissenberg effect) during agitation. The best approach to prepare HMA/PBI/LiCl/NMP dope is to make two separate dopes, one is HMA/LiCl/NMP and the other is PBI/LiCl/NMP, and then blend them together at 100°-120° C. for 1-2 hours at atmospheric pressure with good agitation.

[1]HMA is the developmental designation of a high performance aromatic polyamide produced by HOECHST AG. The HOECHST HMA aromatic polyamide is made from terephthaloyl chloride and a mixture of 3 diamines:

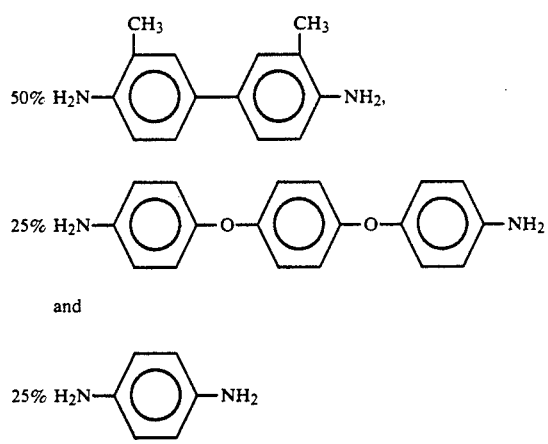

Dopes were prepared from 4 weight percent each of HMA and PBI in a LiCl/NMP solvent system containing 2% LiCl based on solvent. The dopes were cast on cold or hot glass plates and dried at different temperatures. Drying should not take place at temperatures higher than 120° C. for long periods, otherwise the films become dark, a sign of degradation. Films dried at 100° C. in a vacuum seem to be clear and transparent, another sign of miscibility of the component polymers of the blend.

Figure 2A:
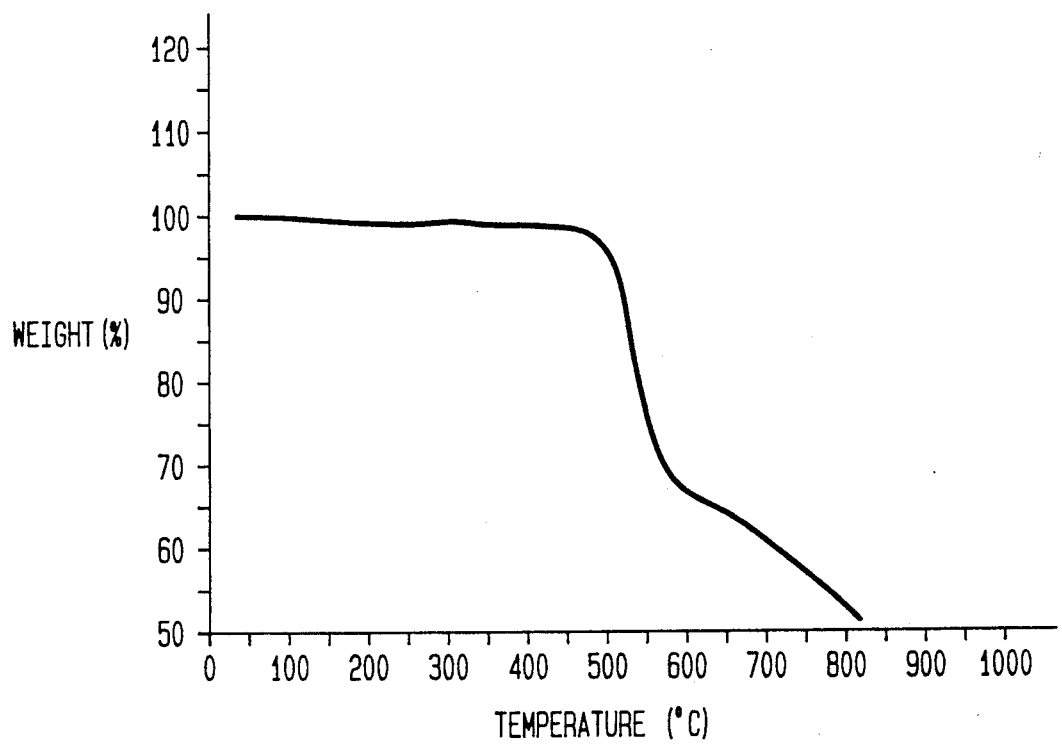
FIG. 2a shows the Thermal Gravimetric Analysis scan of a film of an aromatic copolyamide (HMA).

FIG. 2a shows the Thermal Gravimetric Analysis scan (TGA) of a film of a HOECHST HMA aromatic polyamide. The HMA started to degrade before 500° C. in nitrogen and lost 30% of its weight at 550° C.

Figure 2B:
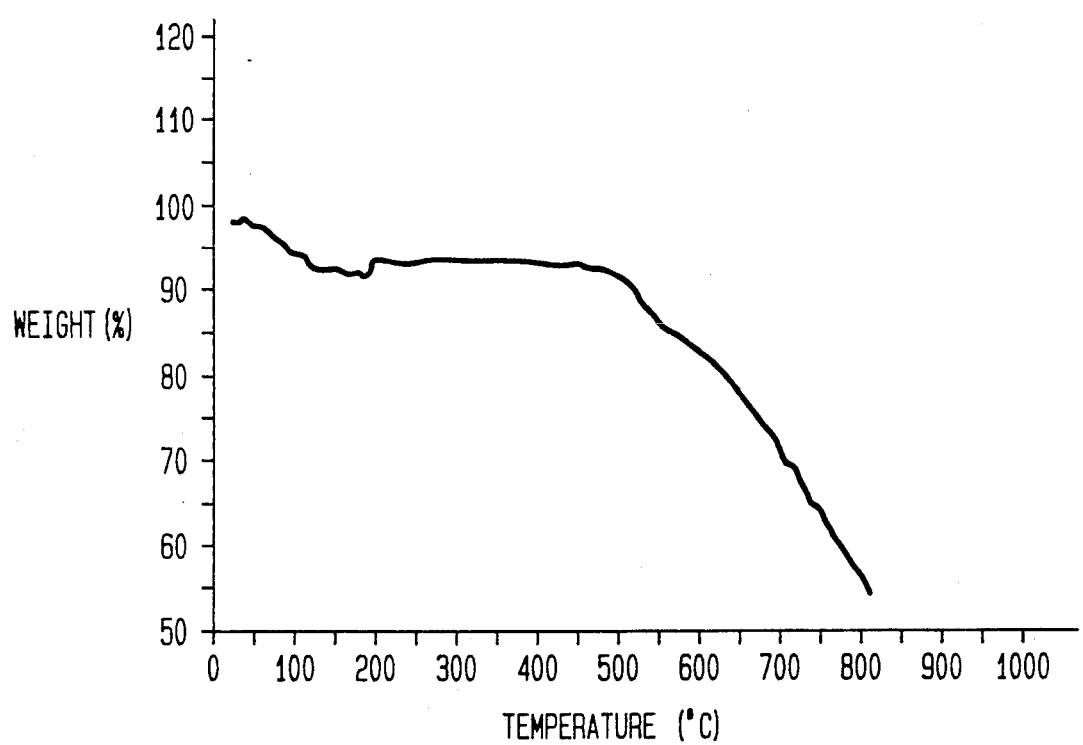
FIG. 2b shows the Thermal Gravimetric Analysis scan of a film of a 50:50 blend of an aromatic copolyamide (HMA) and a polybenzimidazole (PBI).

FIG. 2b shows the Thermal Gravimetric Analysis scan of a film of a 50:50 blend of a HOECHST HMA aromatic polyamide and polybenzimidazole. The film only lost 10% weight (water) at 550° C. These results clearly demonstrate that the polybenzimidazole did protect the HMA from thermal degradation.

Figure 4A:
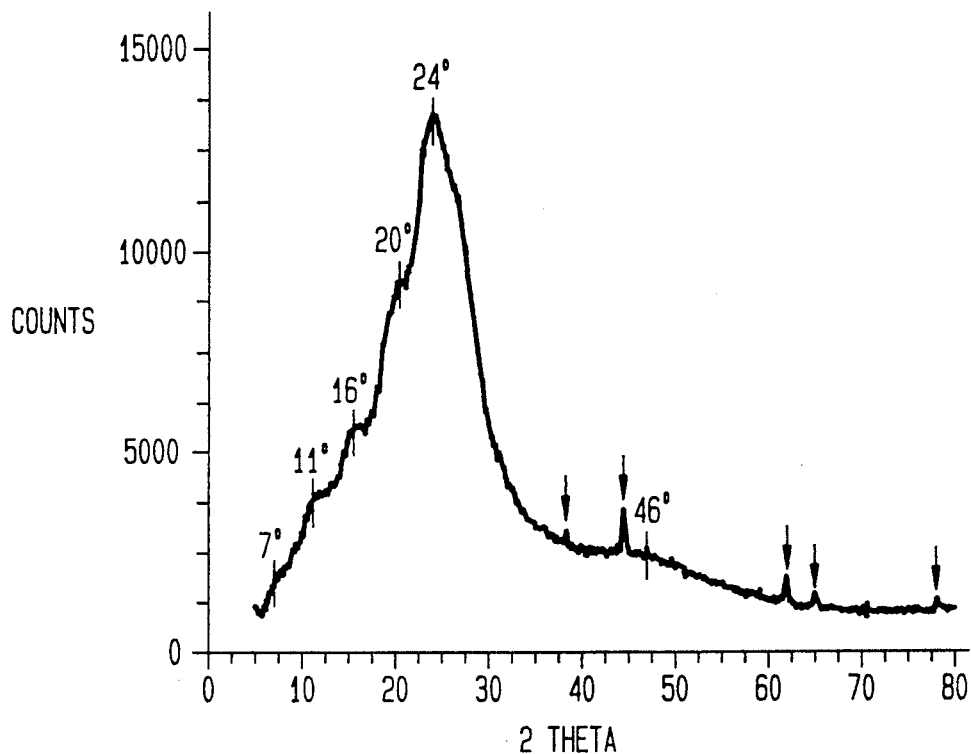
FIG. 4a shows an X-ray diffraction pattern of a film of a polybenzimidazole (PBI).

FIG. 4a shows an X-ray diffraction pattern of a film of polybenzimidazole. A broad peak is observed at ~24° (2θ) with four small amorphous left shoulders found at approximately 7°, 11°, 16° and 20° (2θ). A tiny amorphous region is also observed at ~46° (2θ). The five small sharp peaks indicated by arrows (↓) in FIG. 4a are attributed to the sample holder.

Figure 4B:
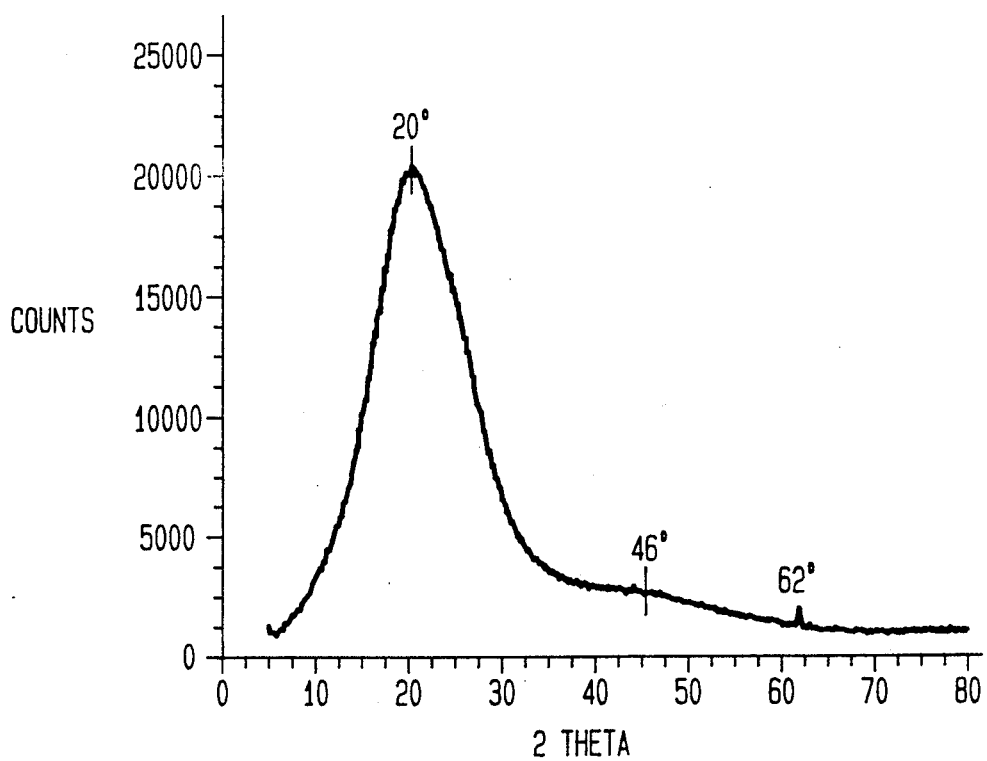
FIG. 4b shows an X-ray diffraction pattern of a film of an aromatic copolyamide (HMA).

FIG. 4b shows an X-ray diffraction pattern of a film of HMA aromatic polyamide. The pattern indicates that the material is amorphous with one broad peak observed at ~20° (2θ) and a very small amorphous region at ~46° (2θ). The small sharp peak at ~62° (2θ) is attributed to the sample holder. Upon comparison of FIGS. 4a and 4b, it may be seen that the major difference is in the region of the major peak.

Figure 4C:
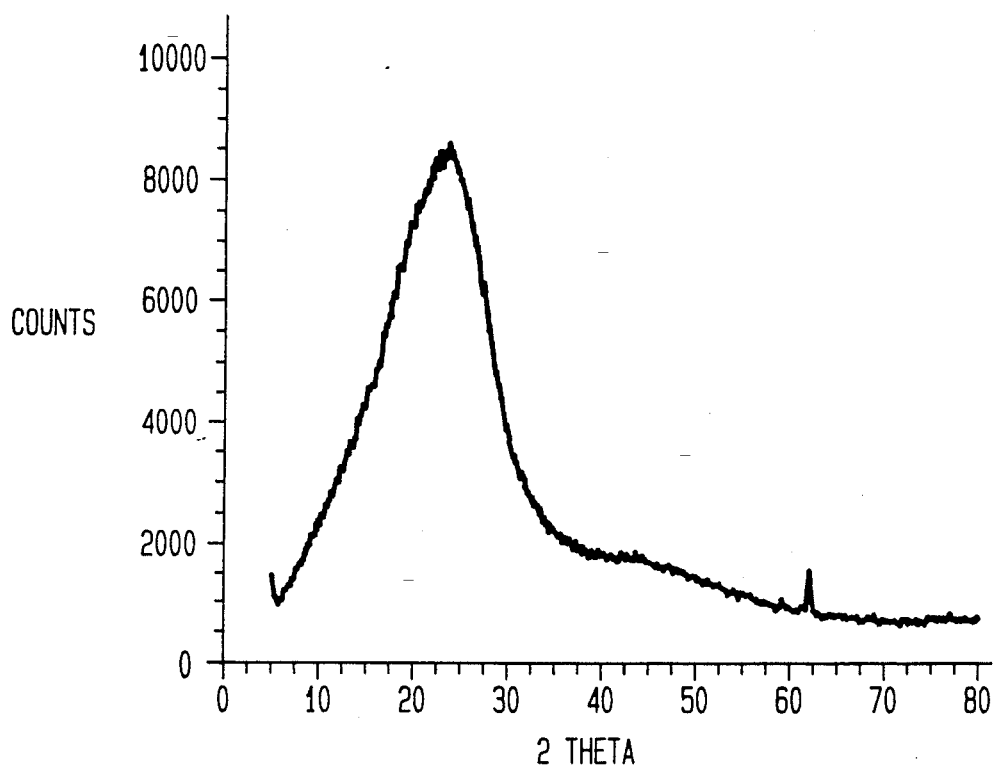
FIG. 4c shows an X-ray diffraction pattern of a film of a 50:50 blend of an aromatic copolyamide (HMA) and a polybenzimidazole (PBI), indicating molecular mixing.

FIG. 4c shows an X-ray diffraction pattern of a film of a 50:50 blend of HMA aromatic polyamide and the polybenzimidazole. There is only one major peak at ~23° (2θ).

Figure 4D:
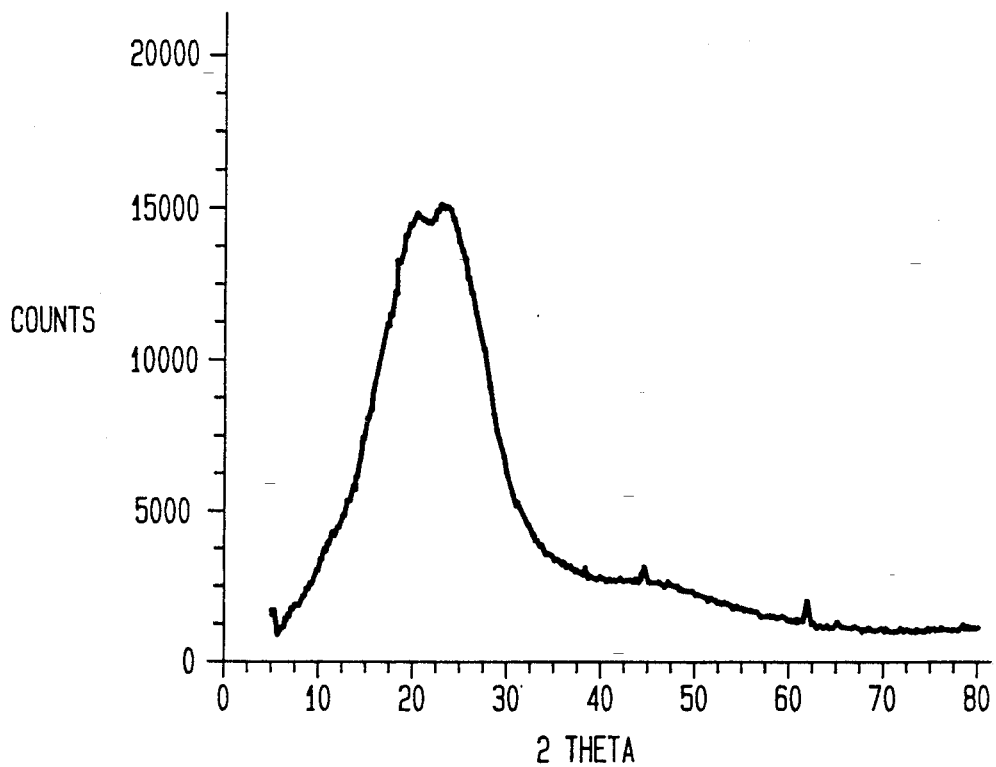
FIG. 4d shows a computer-generated X-ray diffraction pattern addition of 50:50 blend of an aromatic copolyamide (HMA) and polybenzimidazole (PBI), assuming no molecular mixing occurred.

FIG. 4d shows that (assuming no molecular mixing occurred and based on the patterns for 100% polybenzimidazole and 100% HMA aromatic polyamide films) a computer simulated 50:50 addition of the two constituent polymers in the same blend exhibited two overlapping peaks that are estimated to be ~20° (2θ) and 23° (2θ), which represent the HMA aromatic polyamide and the polybenzimidazole, respectively. However, the actual blend of the two component polymers exhibited only one major peak at ~23° (2θ), as shown in FIG. 4c. These results indicate that the blend is molecularly mixed rather than physically mixed on a larger than molecular scale.

Figure 5A:
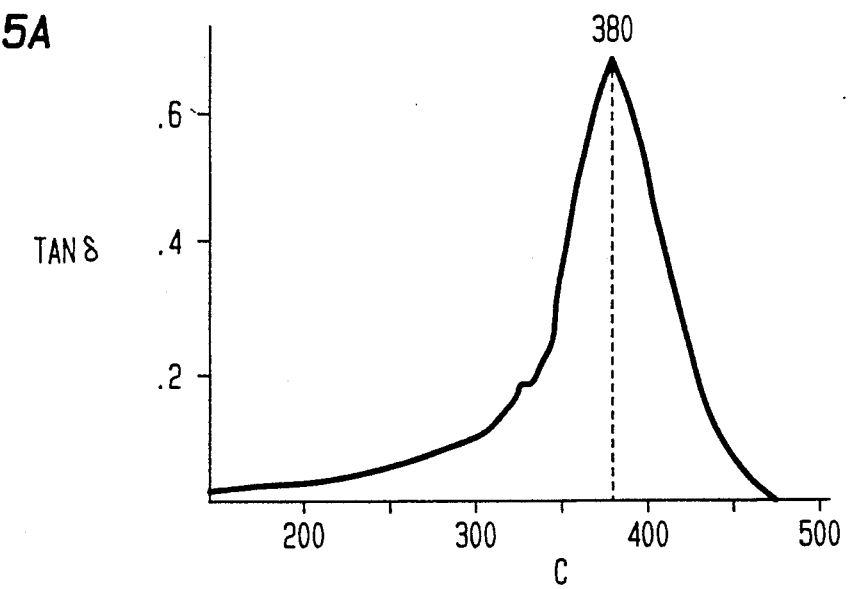
FIG. 5a shows a thermomechanical analysis scan of a blend of 50:50 aromatic copolyamide (HMA) and polybenzimidazole (PBI).

FIG. 5a shows a thermomechanical analysis scan of a 50:50 blend of an aromatic polyamide and a polybenzimidazole.

Figure 5B:
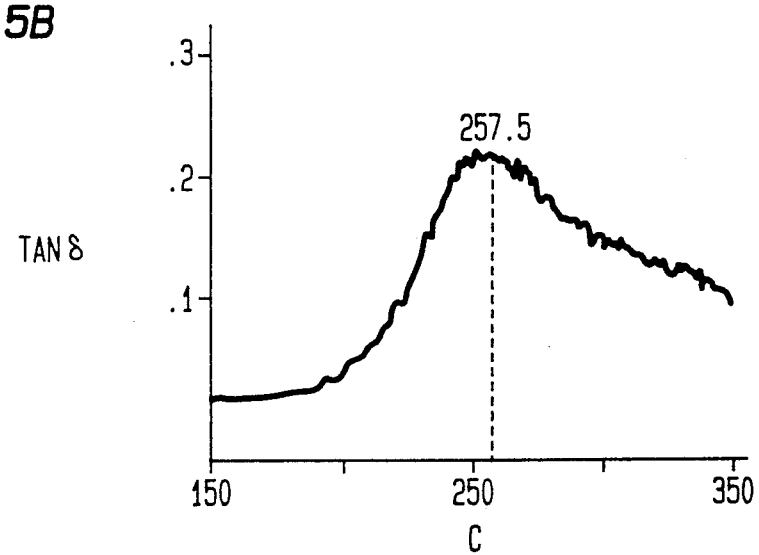
FIG. 5b shows a thermomechanical analysis scan of an aromatic copolyamide (HMA).

FIG. 5b shows a thermomechanical analysis scan of an aromatic polyamide.

Figure 5C:
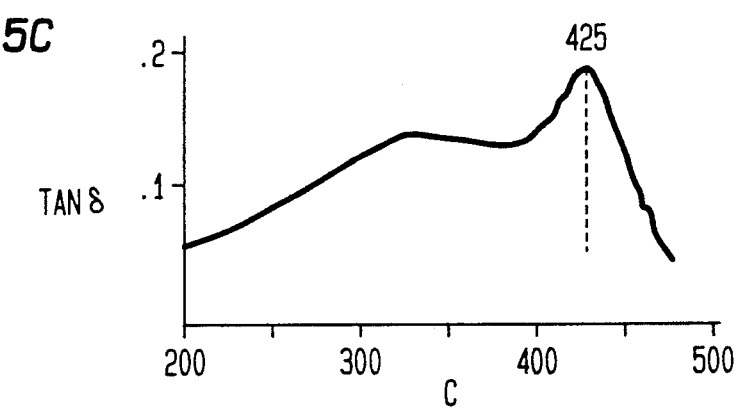
FIG. 5c shows a thermomechanical analysis scan of a polybenzimidazole (PBI).

FIG. 5c shows a thermomechanical analysis scan of a polybenzimidazole.

Dynamic Mechanical Thermal Analysis (DMTA) is an accepted technique for establishing miscibility in blend systems. What one would expect for a miscible blend system is a single Tan δ peak intermediate in position to the peaks of the two component polymers. FIGS. 5a, 5b and 5c suggest that the two component polymers are miscible in the blend. HMA shows a peak in Tan δ at 257.5° C., and PBI shows a glass transition peak at 425° C. The 50:50 blend shows a single Tan δ peak at 380° C.

Figure 6A:
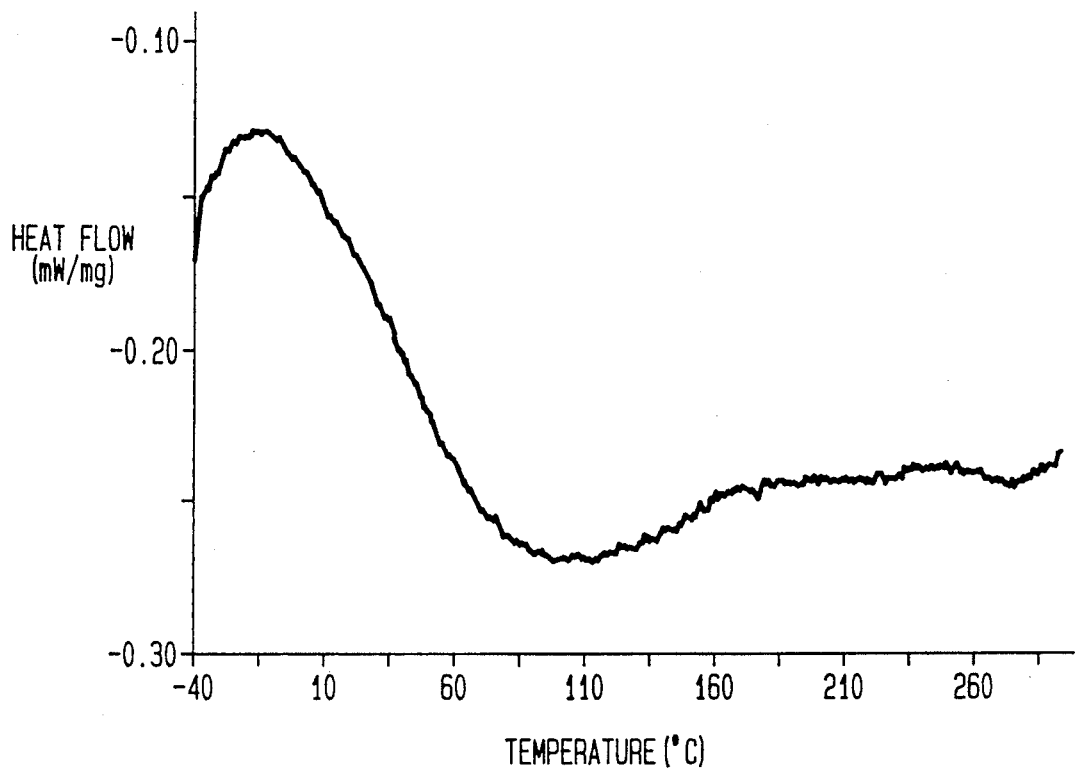
FIG. 6a shows a first heating differential scanning calorimetry curve of an aromatic copolyamide (HMA).

FIG. 6a shows a first heating differential scanning calorimetry (DSC) curve of HMA aromatic polyamide. The first heating ranged from −40° C. to 280° C. and showed two peaks: one is about 100°-110° C., and the other is vague and is about 270°-275° C. The first peak should be the vaporization of water, and the second peak might be the melting point or the initial point of decomposition.

Figure 6B:
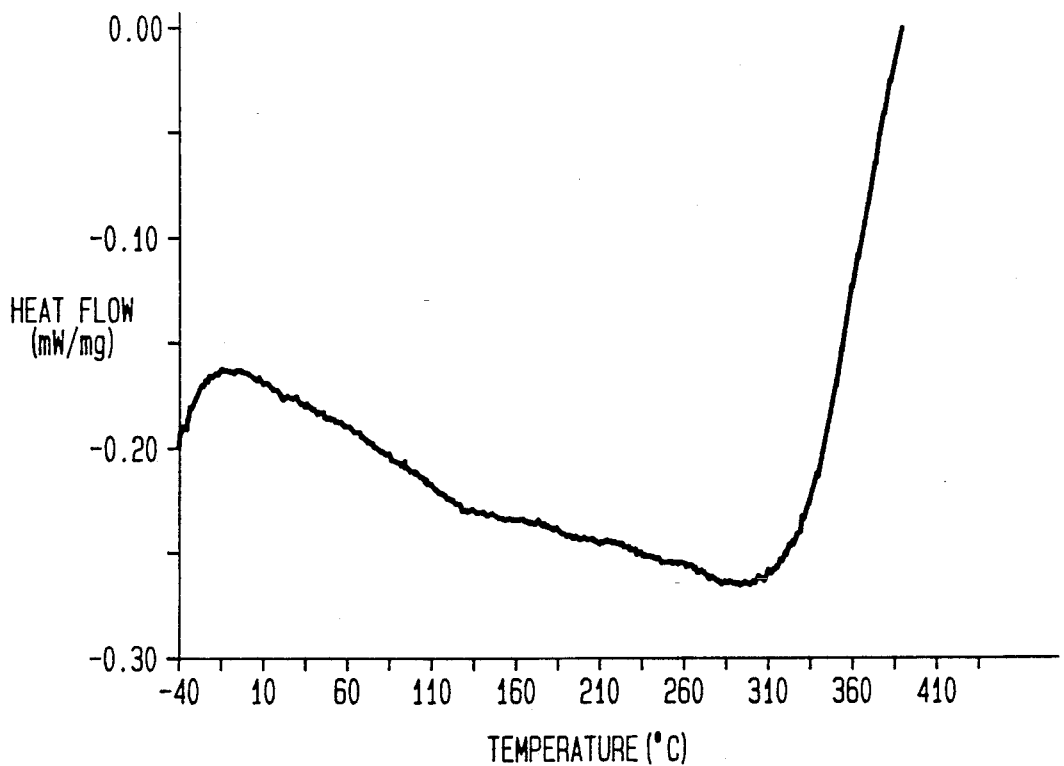
FIG. 6b shows a second heating differential scanning calorimetry curve of an aromatic copolyamide (HMA).

FIG. 6b shows a second heating differential scanning calorimetry curve of the HMA aromatic polyamide. The second heating was conducted on the quenched sample from the first heating and showed that water was almost removed and the vague melting point again appeared around 270°-275° C. The sample decomposed at 310° C., as evidenced by the curve changing from endotherm to exotherm.

Figure 6C:
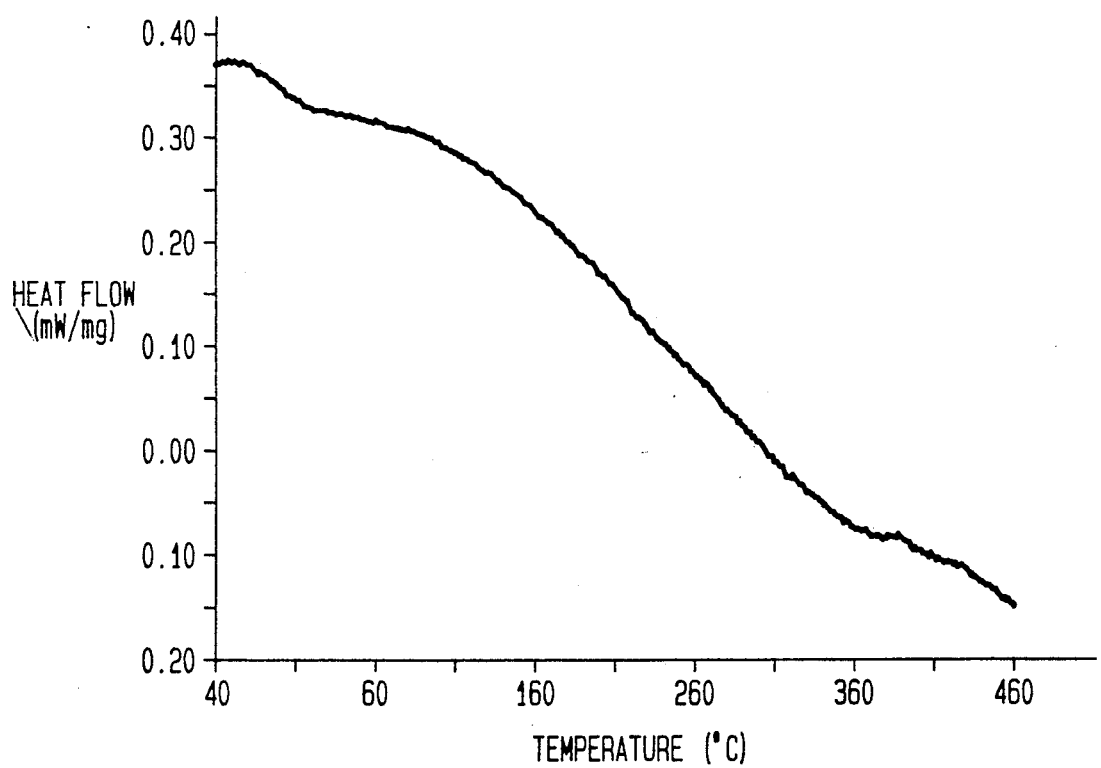
FIG. 6c shows a differential scanning calorimetry curve of a 50:50 blend of an aromatic copolyamide (HMA) and a polybenzimidazole (PBI).

FIG. 6c shows a differential scanning calorimetry curve of a 50:50 blend of the HMA aromatic polyamide and the polybenzimidazole. The endotherm that occurred between 60°-115° C. is the vaporization of water. There was no degradation at 310° C. as happens with HMA itself. The transition at 365° C. may be the $T_g$ of the blend. These results clearly demonstrate that the polybenzimidazole did protect the HMA from thermal degradation.

EXAMPLE 2

A 10.5% solids HMA(28.6%)/PBI(71.4%) dope in NMP for wet-spinning was prepared. The HMA was the same as used in Example 1. The dope contained 2% LiCl. The spinneret had five 100-micron holes. The spin bath was methanol(70%)/DMAc(30%); the draw bath was water at 90° C.; and the hot shoe was at 170° C. The take-up speed was around 10 meters/minute. These fibers were further drawn at 400° C. with a draw ratio from 1:1 to 2.59:1. Drawn fibers were much stronger than as-spun fibers.

The following table includes a property comparison between a HMA(28.6%)/PBI(71.4%) blend fiber and a PBI fiber. As can be seen in the Table, blends of the polybenzimidazole (PBI) with the HOECHST HMA high performance polyamide have better tensile strength than that of the PBI itself.

TABLE 1

| Wet-Spun 28.6/71.4 HMA/PBI Fiber Properties (total solid content of dope = 10.5% in DMAc) | | | | | |
|---|---|---|---|---|---|
| Sample | Denier (dpf) | Draw ratio | Init. Mod./Tenacity/Elongation | | |
| | | | (g/d) | (g/d) | (%) |
| As-Spun Blend Fiber | 17.79 | | 83.6 | 1.91 | 9.92 |
| Heat Treated | 16.67 | 1.005 | 137.2 | 4.42 | 9.05 |
| Heat Treated | 11.86 | 1.5 | 181.1 | 5.5 | 6.49 |
| Heat Treated | 9.35 | 2.0 | 201.9 | 6.15 | 5.83 |
| Heat Treated | 7.41 | 2.6 | 243.1 | 7.69 | 5.65 |
| PBI Control | 7.43 | 2.0 | 66.0 | 3.61 | 47.74 |
| HMA control | 3.13 | 2.0 | 642.0 | 29.3 | 5.58 |

Both TGA and DSC data show that hot-drawn and as-spun fibers had almost the same thermal properties. Their decomposition temperatures were in the range of 400°-450° C. No degradation occurred at 310° C., as happens with HMA itself, which demonstrates that PBI protected HMA from thermal degradation.

Figure 1B:
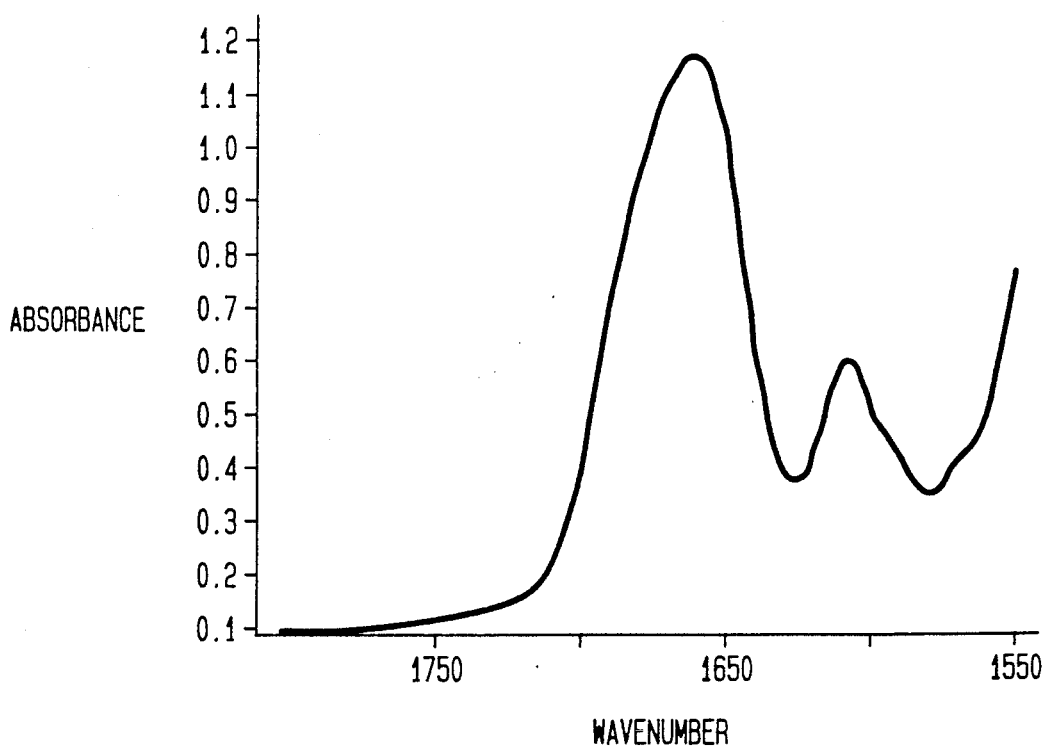
FIG. 1b shows the Fourier Transform IR scan of the aromatic copolyamide (HMA).
Figure 1C:
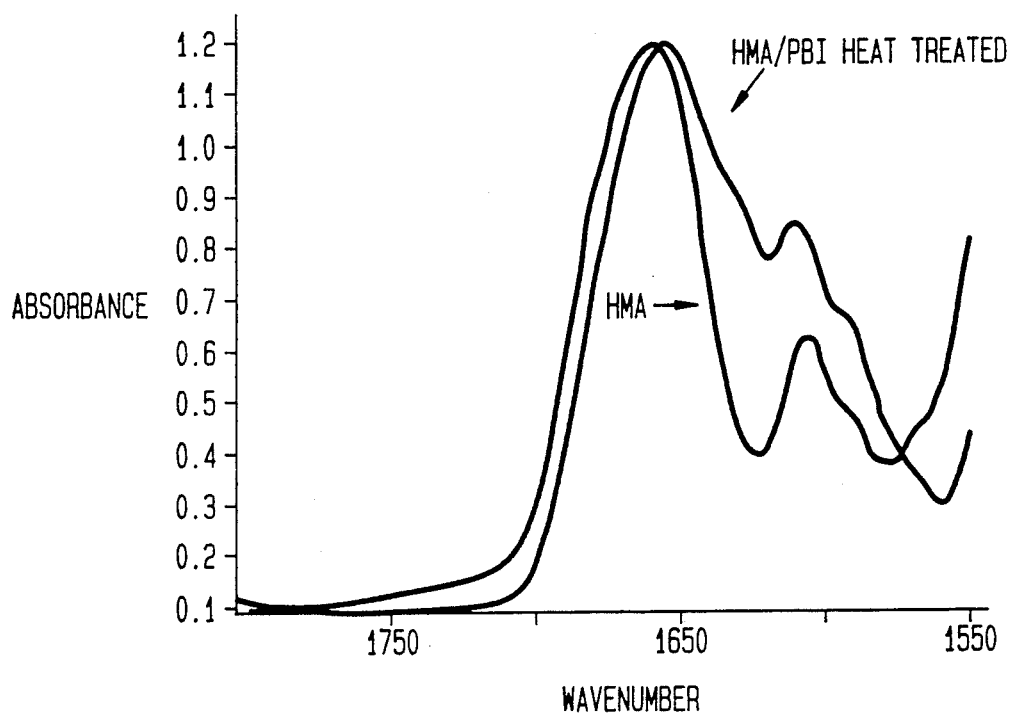

The interaction between the HMA and PBI can be further detected by observing the IR frequency of the carbonyl band. The downfield shifting of the carbonyl band is a well known phenomenon for hydrogen bonding of the carbonyl group. In pure HMA, the carbonyl band appears at 1657 cm$^{-1}$. FIG. 1b shows the Fourier Transform IR scan of HMA film. FIG. 1a shows the Fourier Transform IR observed intermolecular hydrogen bonding in fibers of a 71.4/28.6 polybenzimidazole/HMA aromatic polyamide (HMA) blend. Because of the hydrogen bonding, the absorbance peak of the carbonyl group of the aromatic polyamide shifted from 1657 to 1655 cm$^{-1}$ in the spun fiber and then to 1647 cm$^{-1}$ in the heat-treated and drawn fiber. This frequency shift suggests that the degree of association has increased. FIG. 1c shows the Fourier Transform IR scan of FIG. 1b together with a scan of the heat-treated and drawn fibers of a 71.4/28.6 polybenzimidazole/aromatic copolyamide blend, as shown in FIG. 1a.

EXAMPLE 3

Another variant of HMA aromatic polyamide[2] was found to be more soluble in DMAc and was easier to mix. 50/50 HMA/PBI blend fibers were prepared from both wet and dry spinning processes, and their tensile properties are summarized in Tables 2A and 2B. The wet-spun fiber properties are slightly inferior to those of a dry-spun one, possibly because the former has a greater denier than the latter. Similar results are shown in Tables 3A and 3B for 20/80 HMA/PBI fibers. For wet-spun fibers, the coagulation bath also had a significant effect on the ultimate fiber properties, as illustrated in Table 4. A mixture of ethylene glycol/DMAc solvent provided better coagulation in the process and yielded higher tensile properties in the fibers than those coagulated with water. The effect of drawing on dry-spun fiber properties is given in Table 5, which shows that the best results occurred at a draw ratio of 4.5:1. In addition, we found that as-spun fibers seem to become brittle after remaining in a laboratory for a few weeks, probably due to the evaporation of residual DMAc solvent. Therefore, the hot-drawing process should take place immediately after dry-spinning/washing/drying of the fibers. Otherwise, fiber properties seem to decrease.

[2] HMA is the developmental designation of a high performance aromatic polyamide produced by HOECHST AG. The HOECHST HMA aromatic polyamide is made from terephthaloyl chloride and a mixture of 3 diamines:

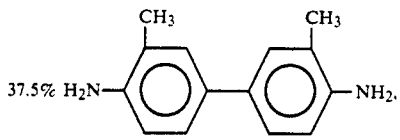

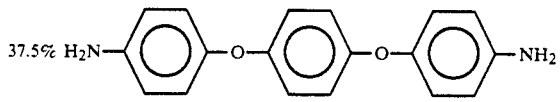

and

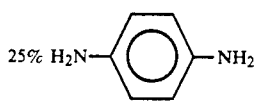

The effect of sulfonation and heat-setting on fiber properties is given in Tables 46A and 6B for 50/50 and 40/60 HMA/PBI blend fibers, respectively. Both modulus and tenacity are decreased as a result of sulfonation and heat-set. However, the denier is slightly increased with the formation of aryl sulfonic acid because the density is increased. Table 6B also lists some additional data showing that high tensile modulus can be attained.

FIG. 3a is a 5,000 magnification scanning electron photomicrograph of a fractured surface of a fiber spun from a 50:50 blend of an aromatic copolyamide and a polybenzimidazole. The photomicrograph shows that the degree of the blend is on the molecular level and that the fracture morphology is similar to that of a typical fracture of a rigid rod-like polymer. FIG. 3b is a 5560 magnification scanning electron photomicrograph of a fracture surface of a fiber spun from a polybenzimidazole and shows no orientation phenomenon. FIGS. 3c and 3d are respectively 2,000 and 5,000 magnification scanning electron photomicrographs of a fracture surface of a fiber spun from an aromatic copolyamide, showing fracture morphology similar to that of the blend in FIG. 3a.

TABLE 2-A

Wet-Spun 50/50 HMA/PBI Fiber Properties
(total solid content of dope = 11% in DMAc)

| Sample | Denier (dpf) | Draw ratio | Init. Mod./ Tenacity/Elongation | | |
|---|---|---|---|---|---|
| | | | (g/d) | (g/d) | (%) |
| As-Spun Fiber | 9.8 | | 73 | 1.78 | 23.46 |
| Hot drawn | 5.75 | 1.5 at 400° C. | 272 | 8.06 | 3.9 |

TABLE 2-B

Dry-Spun 50/50 HMA/PBI Fiber Properties
(total solid content of dope = 11% in DMAc)

| Sample | Denier (dpf) | Draw ratio | Init. Mod./ Tenacity/Elongation | | |
|---|---|---|---|---|---|
| | | | (g/d) | (g/d) | (%) |
| As-Spun Fiber | 3.6 | | 81.4 | 3.781 | 55.2 |
| Hot drawn | 0.783 | 4.5 at 400° C. | 302. | 10.83 | 7.3 |

TABLE 3A

Wet-Spun 20/80 HMA/PBI Fiber Properties
(total solid content of dope = 17.8% in DMAc)

| Sample | Denier (dpf) | Draw ratio | Init. Mod./ Tenacity/Elongation | | |
|---|---|---|---|---|---|
| | | | (g/d) | (g/d) | (%) |
| As-Spun Fiber | 24.5 | | 41.1 | 1.08 | 4.03 |
| Hot drawn | 3.347 | 7 at 440° C. | 181. | 7.33 | 10.43 |

TABLE 3B

Dry-Spun 20/80 HMA/PBI Fiber Properties
(total solid content of dope = 17.8% in DMAc)

| Sample | Denier (dpf) | Draw ratio | Init. Mod./ Tenacity/Elongation | | |
|---|---|---|---|---|---|
| | | | (g/d) | (g/d) | (%) |
| As-Spun Fiber | 4.933 | | 49.96 | 1.74 | 80.48 |
| Hot drawn | 1.121 | 4.5 at 400° C. | 184.76 | 5.71 | 6.47 |

TABLE 4

Effect of Coagulation Solvent on Wet-Spun 50/50
HMA/PBI Fiber Properties
(total solid content of dope = 11% in DMAc)

| Sample | Denier (dpf) | Coagulation solvent | Init. Mod./ Tenacity/Elongation | | |
|---|---|---|---|---|---|
| | | | (g/d) | (g/d) | (%) |
| As-Spun Fiber | 9.8 | 70/30 ethylene glycol/DMAc | 73 | 1.78 | 23.46 |
| Hot drawn at 400° C. DR[3] = 1.5 | 5.75 | 70/30 ethylene glycol/DMAc | 272 | 8.06 | 3.9 |
| As-Spun Fiber | 10.1 | water | 67 | 1.62 | 4.54 |
| Hot drawn at 400° C. DR = 2 | 4.94 | water | 241 | 5.9 | 2.98 |

[3] DR = Draw Ratio.

TABLE 5

Effect of Draw-Ratio on Dry-Spun
50/50 HMA/PBI Fiber Properties
(total solid content of dope = 11% in DMAc)

| Sample | Denier (dpf) | Draw ratio | Init. Mod./ Tenacity/Elongation | | |
|---|---|---|---|---|---|
| | | | (g/d) | (g/d) | (%) |
| A | 1.974 | 1.5 at 400° C. | 211. | 7.53 | 11. |

TABLE 5-continued

Effect of Draw-Ratio on Dry-Spun
50/50 HMA/PBI Fiber Properties
(total solid content of dope = 11% in DMAc)

| Sample | Denier (dpf) | Draw ratio | Init. Mod. (g/d) | Tenacity (g/d) | Elongation (%) |
|---|---|---|---|---|---|
| B | 1.780 | 2.0 | 231. | 8.10 | 10.8 |
| C | 1.406 | 2.5 | 252. | 9.66 | 10.4 |
| D | 1.082 | 3.0 | 254. | 10.50 | 9.7 |
| E | 0.952 | 3.5 | 288. | 10.26 | 7.6 |
| F | 0.783 | 4.5 | 302. | 10.83 | 7.3 |
| G | 0.642 | 5.5 | 287. | 10.33 | 6.4 |

TABLE 6A

Effect of Sulfonation and Heat-Set on Dry-Spun
50/50 HMA/PBI Fiber Properties
(total solid content of dope = 11% in DMAc)

| Sample | Denier (dpf) | Draw ratio | Init. Mod. (g/d) | Tenacity (g/d) | Elongation (%) |
|---|---|---|---|---|---|
| as-spun/ hot drawn | 0.925 | 4.5 at 400° C. | 268. | 9.4 | 6.7 |
| acid-treated | 1.139 | | 196. | 6.5 | 5.1 |
| heat-set | 1.224 | 0.997 at 380° C. | 189 | 6.8 | 4.4 |

TABLE 6B

Effect of Sulfonation and Heat-Set on Dry-Spun
40/80 HMA/PBI Fiber Properties
(total solid content of dope = 13.6% in DMAc)

| Sample | Denier (dpf) | Draw ratio | Init. Mod. (g/d) | Tenacity (g/d) | Elongation (%) |
|---|---|---|---|---|---|
| as-spun/ hot drawn | 1.564 | 4.5 at 400° C. | 261. | 9.0 | 8.0 |
| acid-treated | 1.771 | | 189. | 5.74 | 5.9 |
|  | 2.006 | | 195. | 6.43 | 7.2 |
| heat-set | 1.652 | 0.997 at 380° C. | 198. | 5.44 | 5.2 |
| heat-set | 1.782 | 0.995 | 188. | 5.9 | 5.0 |
| heat-set | 2.225 | 0.993 | 212. | 6.5 | 5.8 |
|  | 1.944 | 0.993 | 211. | 7.9 | 7.7 |
| heat-set | 2.332 | 0.990 | 194. | 6.3 | 6.2 |

The following Table 7 shows comparative data for PBI and sulfonated PBI fibers.

TABLE 7

Properties of PBI and Sulfonated PBI Fibers

| Properties | Sulfonated PBI | PBI |
|---|---|---|
| Denier per filament | 1.5 | 1.5 |
| Modulus (g/d) | 45 | 90 |
| Tenacity (g/d) | 2.7 | 3.1 |
| Break Elongation (%) | 30 | 30 |
| Density (g/cc) | 1.43 | 1.39 |

EXAMPLE 4

Aromatic polyamide-hydrazides are prepared by solution polymerization in DMAc containing LiCl[4]. Therefore, it is possible to blend a PBI solution in DMAc containing LiCl with a polyamide-hydrazide dope prepared from terephthaloyl chloride and para-amino benzhydrazide in DMAc with LiCl. The polyamide-hydrazide dopes are similar to the HMA dopes and have high viscosities at low solids due to their linearity. The polyamide-hydrazide dopes are used at 5-10% solids as compared with PBI, which is usually fabricated as a 20-25% solids dope. The resulting blend dope (e.g., 50:50) is then be used to cast films and spin fibers and fibrets, the aromatic polyamide-hydrazide improving both the strength and modulus of the blend as compared to PBI itself.

[4] The procedure is to dissolve the p-aminobenzhydrazide in DMAc and 5% LiCl and cool to −10° C. Then add the terephthaloyl chloride with stirring and let it warm to room temperature. This gives a viscous dope in a half hour. Because the polymerization produces HCl which remains in the DMAc, the HCl is neutralized after viscosity increases and prior to spinning by adding LiCO3 and heating the dope to 80° C. This generates more LiCl. The final solids of the solution is about 5-10%.)

EXAMPLE 5

Aromatic polyamides containing heterocyclic linkages may be prepared by solution polymerization in DMAc containing LiCl[5]. Therefore, it is possible to blend a PBI solution in DMAc containing LiCl with a polyamide dope prepared from

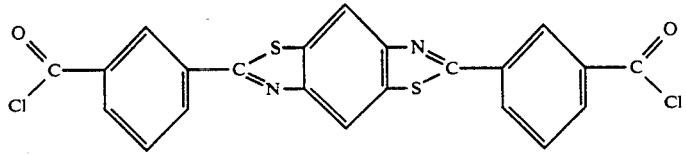

and 4,4'-diaminodiphenyl ether in DMAc with LiCl. The dope is similar to the HMA dopes and has high viscosity at low solids; thus it may be used at 5-10% solids as compared with PBI, which is usually fabricated as a 20-25% solids dope. The resulting blend dope (e.g., 50:50) is then be used to cast films and spin fibers and fibrets, the aromatic polyamide containing heterocyclic linkages improving both the strength and modulus of the blend as compared to PBI itself.

[5] The procedure is to dissolve the 4,4'-diaminodiphenyl ether in DMAc and 5% LiCl and cool the resulting solution to −10° C. Then add the acid chloride with stirring and let the solution warm to room temperature. Because the polymerization produces HCl, which remains in the DMAc, the HCl is neutralized after viscosity increases and prior to spinning by adding LiCO3 and heating the dope to 80° C. This generates more LiCl. The final solids content of the solution is about 5-10%.

What is claimed is:

1. A blend of component polymers consisting essentially of from about 5 weight percent to about 95 weight percent of a polybenzimidazole and from about 95 weight percent to about 5 weight percent of an aromatic polyamide, aromatic polyamide-hydrazide or aromatic polyamide containing heterocyclic linkages.

2. A blend as claimed in claim 1 in which the polybenzimidazole contains units of the formula:

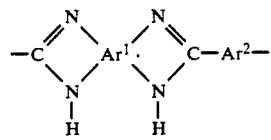

wherein

represents a tetravalent aromatic moiety having the formula:

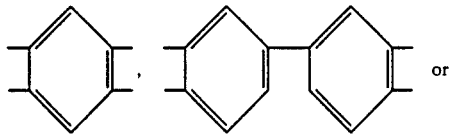 or

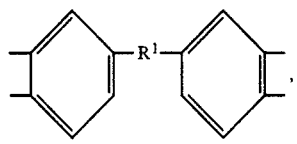, wherein $R^1$ is —O—, —SO$_2$—, —CH=CH—, or (—CH$_2$—)$_x$ and x is an integer of from 1 to 4; and —Ar$^2$— represents a divalent aromatic moiety having the formula:

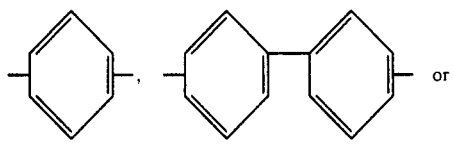 or

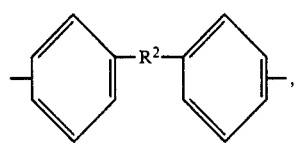, wherein $R^2$ is —O—, —SO$_2$—, —CH=CH—, or (—CH$_2$—)$_x$ and x is an integer of from 1 to 4.

3. A blend as claimed in claim 2 in which the polybenzimidazole is poly-2,2'-(m-phenylene)-5,5'-bibenzimidazole.

4. A blend as claimed in claim 1 in which the aromatic polyamide contains units of the formula:

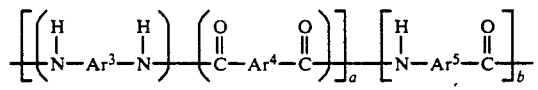

wherein Ar$^3$ and Ar$^4$ and Ar$^5$ represent divalent aromatic moieties having from 6 to about 18 carbon atoms or mixtures thereof; and wherein a has a value of 0.5 to 1, b is 0 or a value less than 0.5, and the sum of a and b is equal to 1.

5. A blend as claimed in claim 4 in which the aromatic polyamide is comprised of units

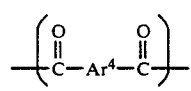 A

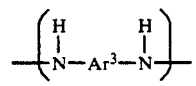 B

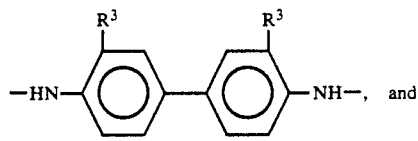 C

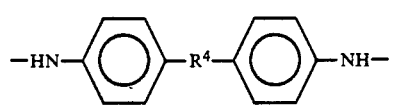 D where, in Ar$^3$ and Ar$^4$ the valence bonds are in para- or comparable coaxial or parallel position; $R^3$ is a halogen radical, or an alkyl or alkoxy radical each having up to 4 carbon atoms; $R^4$ is a substituted or unsubstituted methylene radical or a grouping —O—Ar$^3$—O—, wherein —Ar$^3$— is as specified above, and the mole % proportions of the diamine components B, C and D relative to the total amount of diamine components are within a domain which is defined by the following corner points:

point Q corresponds to 5 mole % of B, 45 mole % of C and 50 mole % of D;

point R corresponds to 45 mole % of B, 5 mole % of C and 50 mole % of D;

point S corresponds to 60 mole % of B, 35 mole % of C and 5 mole % of D;

point T corresponds to 20 mole % of B, 75 mole % of C and 5 mole % of D;

point U corresponds to 5 mole % of B, 80 mole % of C and 15 mole % of D;

and the aromatic polyamide has an inherent viscosity of about 2.4 to 6.5 dl/g (measured on solutions of 0.5 g of polyamide in 100 ml of 98% by weight concentrated H$_2$SO$_4$ at 25° C.).

6. A blend as claimed in claim 5 in which the proportions of diamine components B, C and D relative to the total amount of diamine components are within a domain which is defined by the following corner points:

point Q' corresponds to 15 mole % of B, 45 mole % of C and 40 mole % of D;

point R' corresponds to 40 mole % of B, 20 mole % of C and 40 mole % of D;

point S' corresponds to 50 mole % of B, 40 mole % of C and 10 mole % of D;

point T' corresponds to 15 mole % of B, 75 mole % of C and 10 mole % of D.

7. A blend as claimed in claim 4 in which the proportions of diamine components B, C and D relative to the total amount of diamine components are within a domain which is defined by the following corner points:

point W corresponds to 5 mole % of B, 45 mole % of C and 50 mole % of D;

point X corresponds to 45 mole % of B, 5 mole % of C and 50 mole % of D;

point Y corresponds to 45 mole % of B, 40 mole % of C and 15 mole % of D;

point Z corresponds to 5 mole % of B, 80 mole % of C and 15 mole % of D;

and the aromatic polyamide has an inherent viscosity of about 2.4 to 5.0 dl/g (measured on solutions of 0.5 g of polyamide in 100 ml of 98% by weight concentrated H₂SO₄ at 25° C.).

8. A blend as claimed in claim 7 in which the proportions of diamine components B, C and D relative to the total amount of diamine components are within a domain which is defined by the following corner points:
point W' corresponds to 15 mole % of B, 50 mole % of C and 35 mole % of D;
point X' corresponds to 45 mole % of B, 20 mole % of C and 35 mole % of D;
point Y corresponds to 45 mole % of B, 40 mole % of C and 15 mole % of D;
point Z' corresponds to 15 mole % of B, 70 mole % of C and 15 mole % of D.

9. A process for preparing miscible blends of component polymers as claimed in claim 1 which comprises dissolving a polybenzimidazole and an aromatic polyamide, aromatic polyamide-hydrazide or aromatic polyamide containing heterocyclic linkages in a mutual evaporative solvent in relative weight proportions of each polymer of from about 5 to about 95 weight percent of the polybenzimidazole to about 95 to about 5 weight percent of the aromatic polyamide, aromatic polyamide-hydrazide or aromatic polyamide containing heterocyclic linkages, and then adding the solution to a non-solvent for the blend to precipitate the novel blend and subsequently drying the blend.

10. A process as claimed in claim 9 in which the polybenzimidazole contains units of the formula:

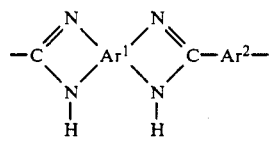

wherein

represents a tetravalent aromatic moiety having the formula:

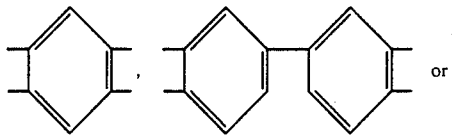

wherein R¹ is —O—, —SO₂—, —CH=CH—, or (—CH₂—)ₓ and x is an integer of from 1 to 4; and —Ar²— represents a divalent aromatic moiety having the formula:

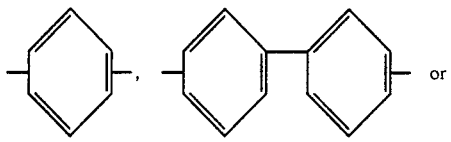

wherein R² is —O—, —SO₂—, —CH=CH—, or (—CH₂—)ₓ and x is an integer of from 1 to 4; and the aromatic polyamide has the following unit formula:

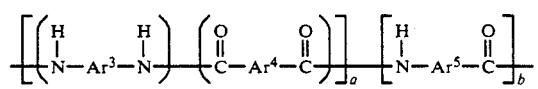

wherein Ar³ and Ar⁴ and Ar⁵ represent divalent aromatic moieties having from 6 to about 18 carbon atoms, or mixtures thereof; and wherein a has a value of 0.5 to 1, b is 0 or a value less than 0.5, and the sum of a and b is equal to 1.

11. A process as claimed in claim 10 in which the aromatic polyamide has repeating units derived from terephthalic acid and the following diamines:

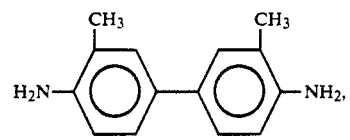

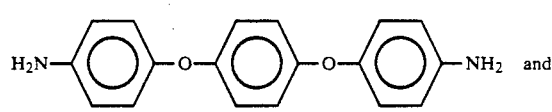 and

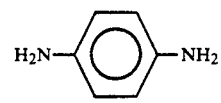

in a diamine mole ratio of 50:25:25 or 37.5:37.5:25.

12. A process as claimed in claim 10 in which the polybenzimidazole is poly-2,2'-(m-phenylene)-5,5'-bibenzimidazole.

13. A process as claimed in claim 10 in which the polybenzimidazole is poly-2,2'-(m-phenylene)-5,5'-bibenzimidazole and the aromatic polyamide has repeating units derived from terephthalic acid and the following diamines:

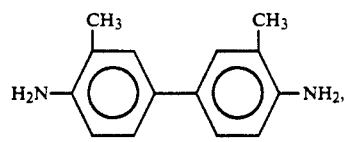

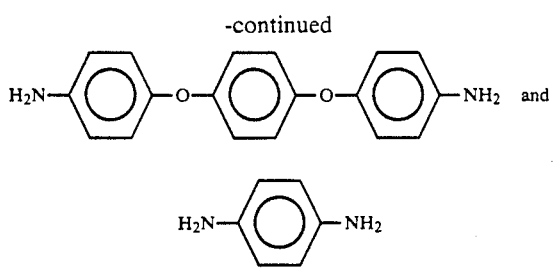

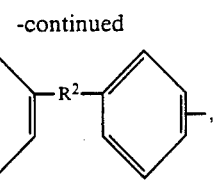

in a diamine mole ratio of 50:25:25 or 37.5:37.5:25 wherein $R^2$ is —O—, —SO$_2$—, —CH=CH—, or (—CH$_2$—)$_x$ and x is an integer of from 1 to 4; and the aromatic polyamide-hydrazide has the following unit formula:

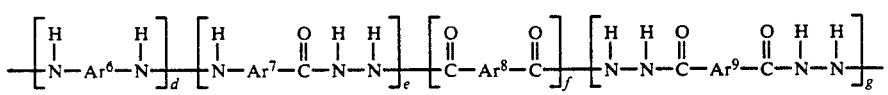

wherein $Ar^6$, $Ar^7$, $Ar^8$ and $Ar^9$ represent divalent aromatic moieties having from 6 to about 18 carbon atoms, or mixtures thereof; and wherein d has a value of 0.5 to 1, e is 0 or a value less than 0.5, g is 0 or a value of less than 0.5, and the sum of d, e and g is equal to f.

14. A process as claimed in claim 9 in which the polybenzimidazole contains units of the formula:

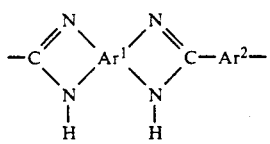

wherein

represents a tetravalent aromatic moiety having the formula:

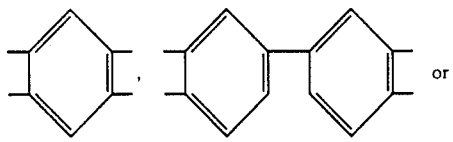

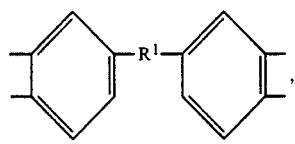

wherein $R^1$ is —O—, —SO$_2$—, —CH=CH—, or (—CH$_2$—)$_x$ and x is an integer of from 1 to 4; and —AR$^2$— represents a divalent aromatic moiety having the formula:

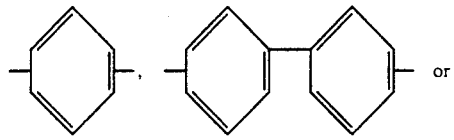

15. A process as claimed in claim 9 in which the polybenzimidazole contains units of the formula:

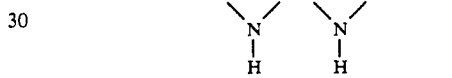

wherein represents a tetravalent aromatic moiety having the formula:

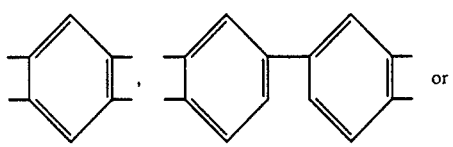

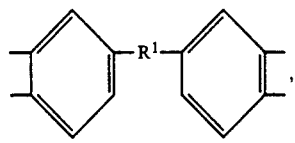

wherein $R^1$ is —O—, —SO$_2$—, —CH=CH—, or (—CH$_2$—)$_x$ and x is an integer of from 1 to 4; and —Ar$^2$— represents a divalent aromatic moiety having the formula:

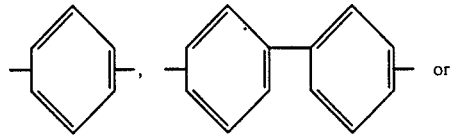

-continued

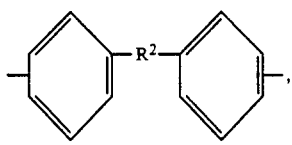

wherein $R^2$ is —O—, —$SO_2$—, —CH=CH—, or (—$CH_2$—)$_x$ and x is an integer of from 1 to 4; and the aromatic polyamide containing heterocyclic linkages has the following unit formula:

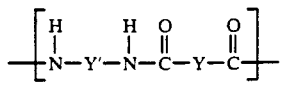

wherein Y' and Y separately represent $Ar^{10}$ and $Ar^{10}$—X—$Ar^{11}$—X—$Ar^{10}$, wherein $Ar^{10}$ and $Ar^{11}$ are multivalent aromatic moieties having from 6 to about 18 carbon atoms, or mixtures thereof; and X is a 5 or 6 member ring heterocyclic radical containing 2 or 3 hetero ring elements selected from the group consisting of N, O and S, and wherein at least one $Ar^{10}$—X—$Ar^{11}$—X—$Ar^{10}$ radical must be present in the recurring structural unit and the moiety —X—$Ar^{11}$—X— may represent a fused ring system.

* * * * *